United States Patent
Kusaka

(10) Patent No.: US 7,880,975 B2
(45) Date of Patent: Feb. 1, 2011

(54) ZOOM LENS AND IMAGING DEVICE HAVING SAME

(75) Inventor: Yusuke Kusaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 12/478,644

(22) Filed: Jun. 4, 2009

(65) Prior Publication Data

US 2009/0323198 A1    Dec. 31, 2009

(30) Foreign Application Priority Data

Jun. 6, 2008    (JP) .............................. 2008-149226

(51) Int. Cl.
  *G02B 15/14*  (2006.01)
  *H04N 5/262*  (2006.01)
(52) U.S. Cl. ..................... 359/686; 359/687; 348/240.1
(58) Field of Classification Search .............. 348/240.1; 359/684, 685, 686, 687
  See application file for complete search history.

(56) References Cited

U.S. PATENT DOCUMENTS

| | | | |
|---|---|---|---|
| 6,594,087 B2 | 7/2003 | Uzawa | |
| 6,825,989 B2 | 11/2004 | Uzawa | |
| 7,057,818 B2 | 6/2006 | Hamano | |
| 7,190,529 B2 | 3/2007 | Miyajima | |
| 7,286,304 B1 | 10/2007 | Ohtake | |
| 7,408,720 B2 * | 8/2008 | Ito et al. ..................... | 359/687 |
| 2010/0103532 A1 * | 4/2010 | Saito .......................... | 359/687 |

* cited by examiner

*Primary Examiner*—David N Spector
(74) *Attorney, Agent, or Firm*—Canon USA Inc IP Div

(57) ABSTRACT

A zoom lens includes a first lens group having a positive refractive power, a second lens group having a negative refractive power, a third lens group having a positive refractive power, and a fourth lens group having a positive refractive power or a negative refractive power. The lens groups are arranged in order from the object side toward the image side. The focal lengths of the system at a wide angle end and a telephoto end, the focal lengths of the first and second lens groups, the distance between the position of the first lens group, the position being closest to the object side upon zooming, and the position of the first lens group at the wide angle end, and the difference between the largest distance between the first and second lens groups upon zooming and the distance between the first and second lens groups at the wide angle end are determined.

10 Claims, 25 Drawing Sheets

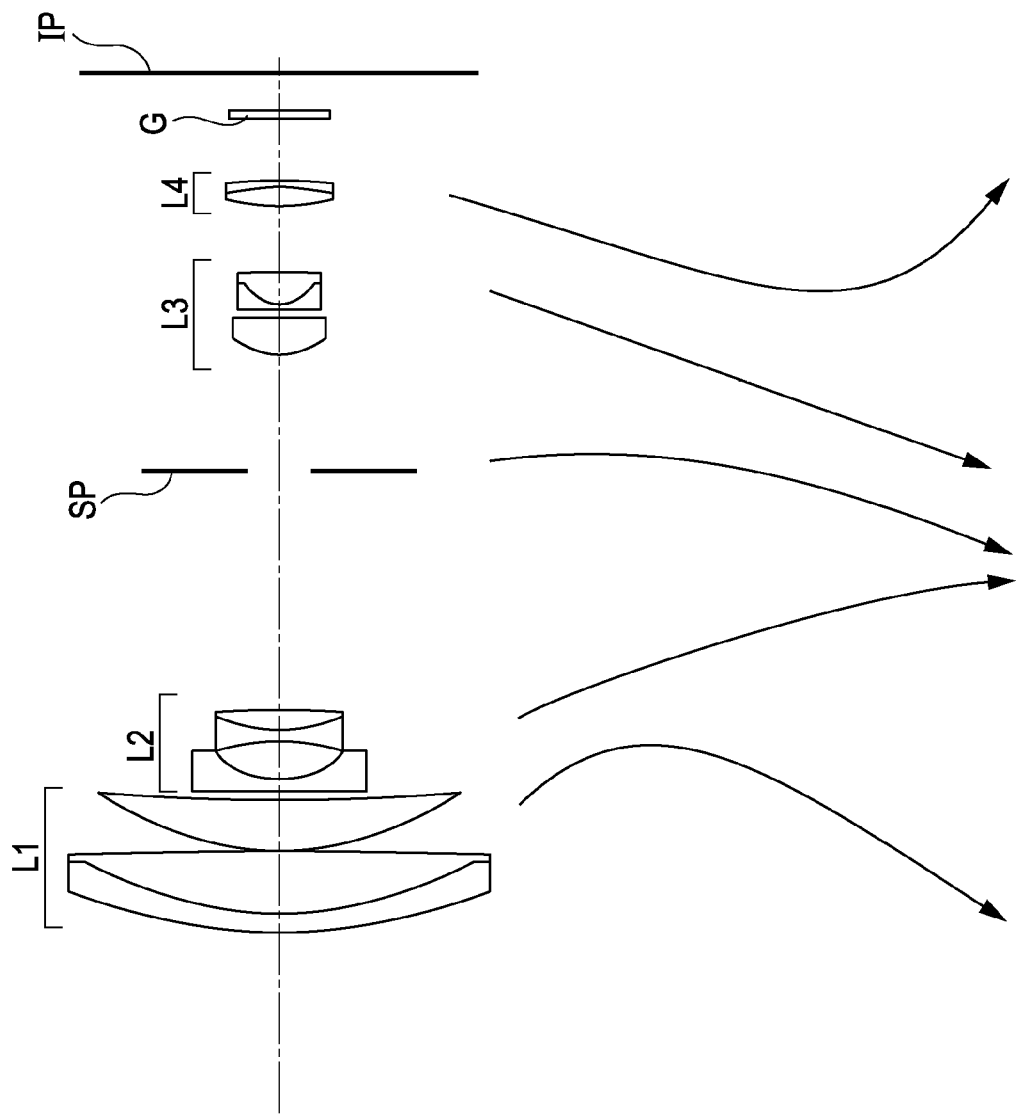

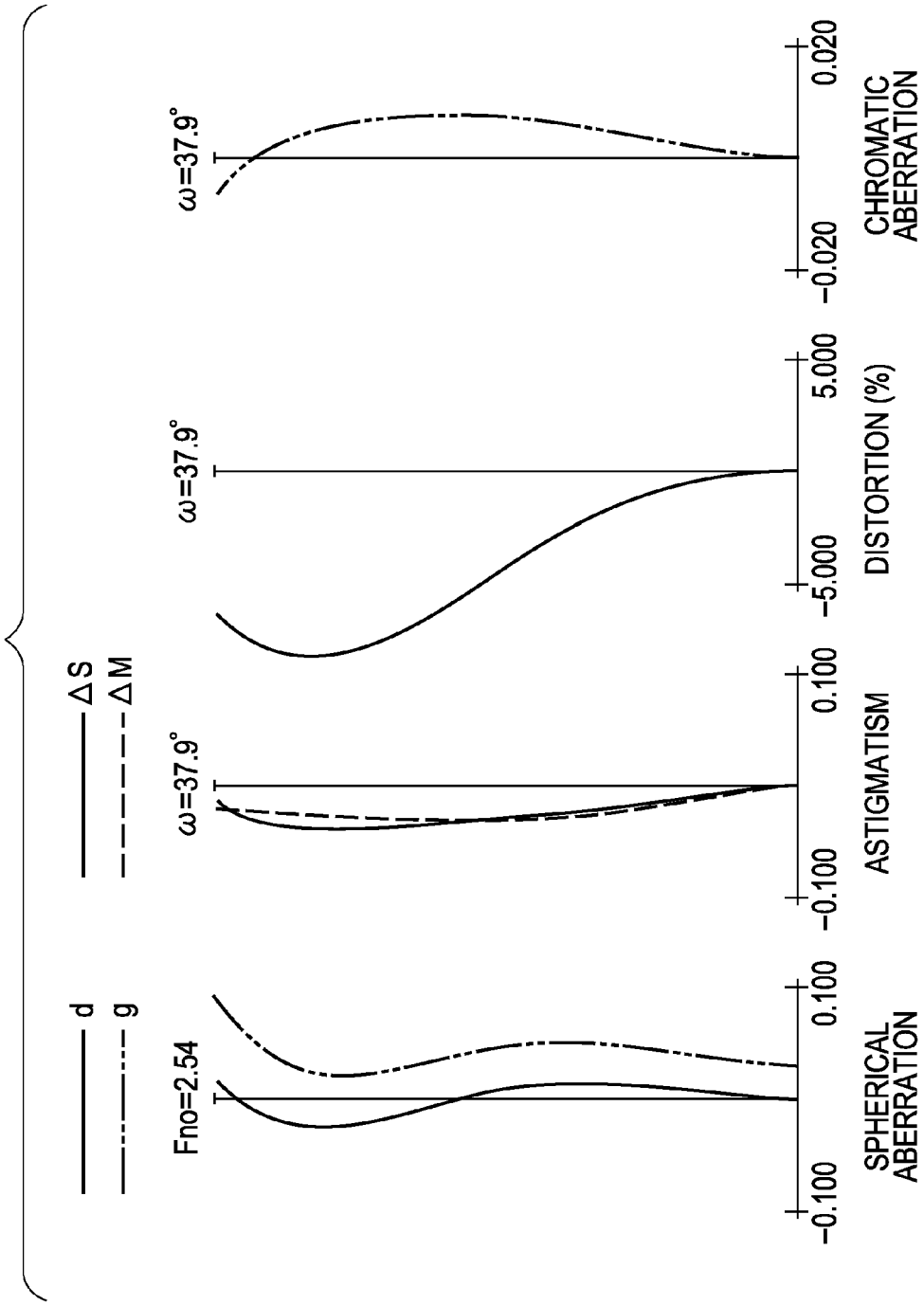

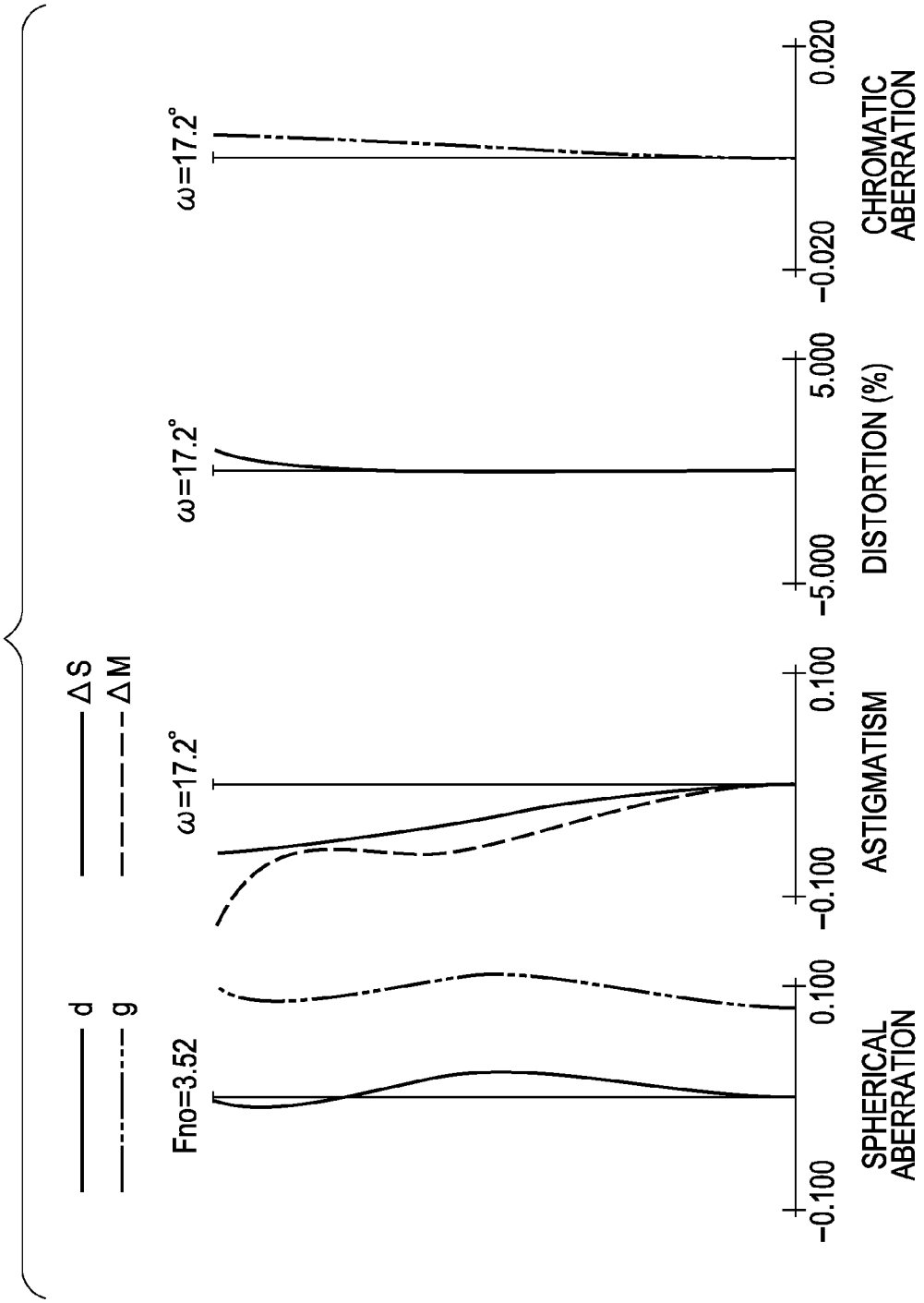

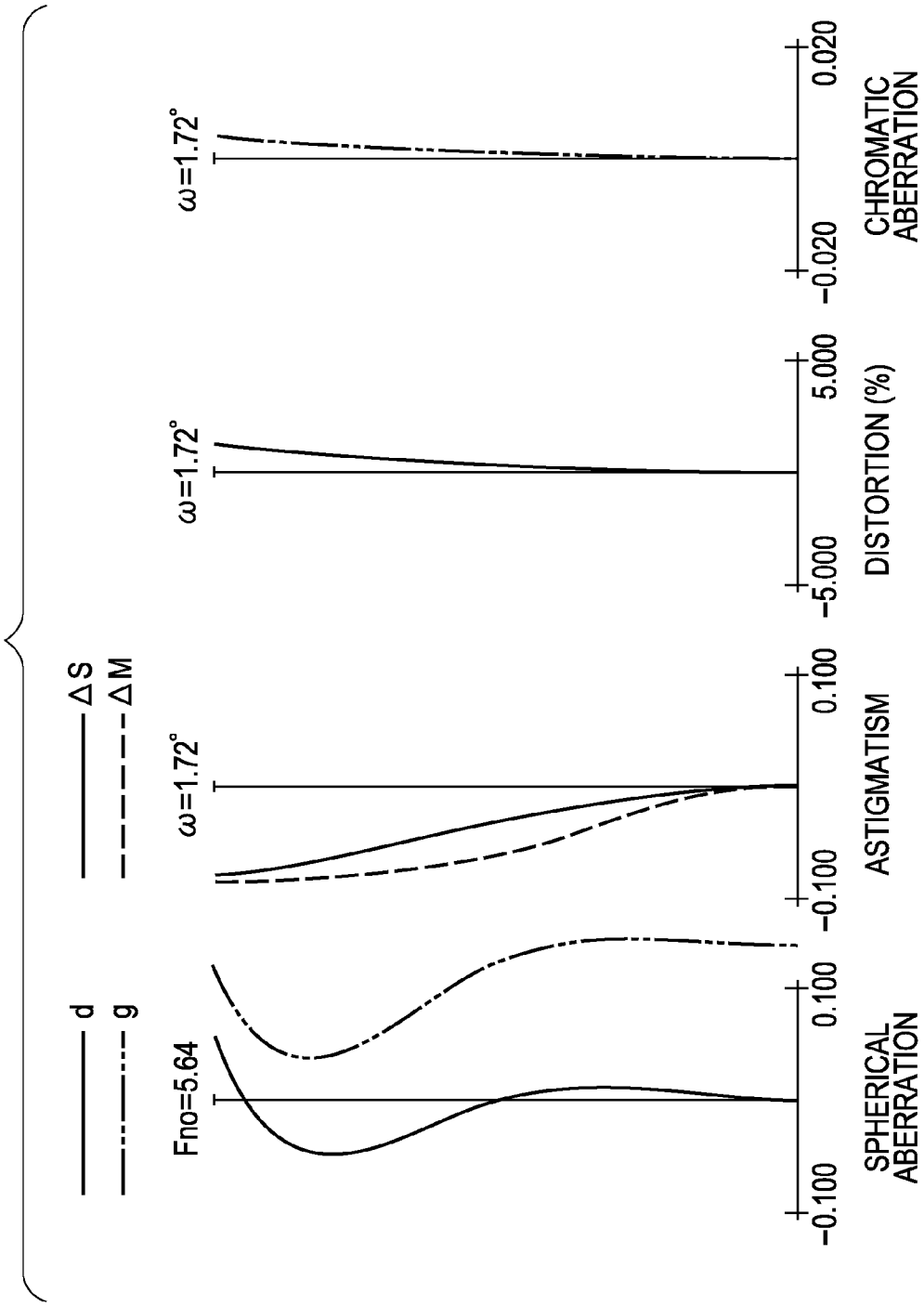

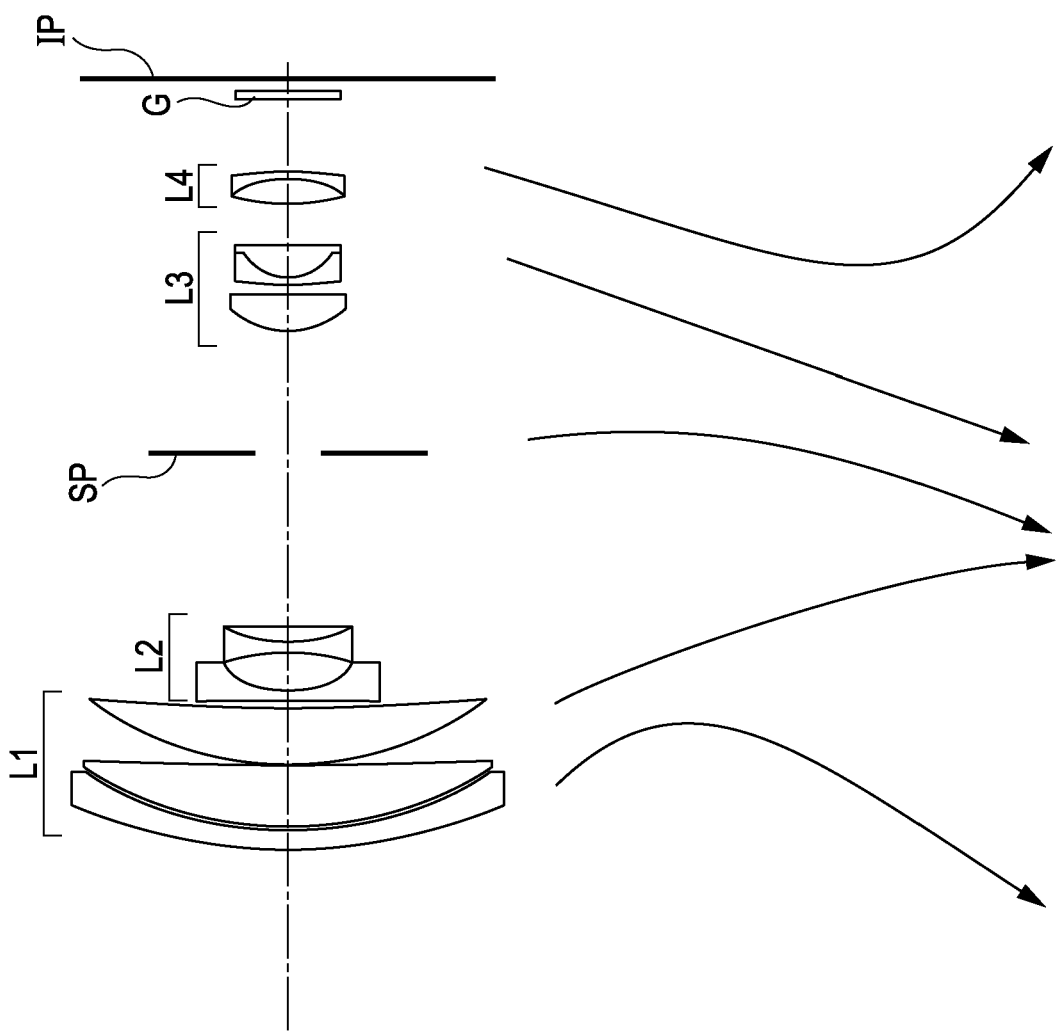

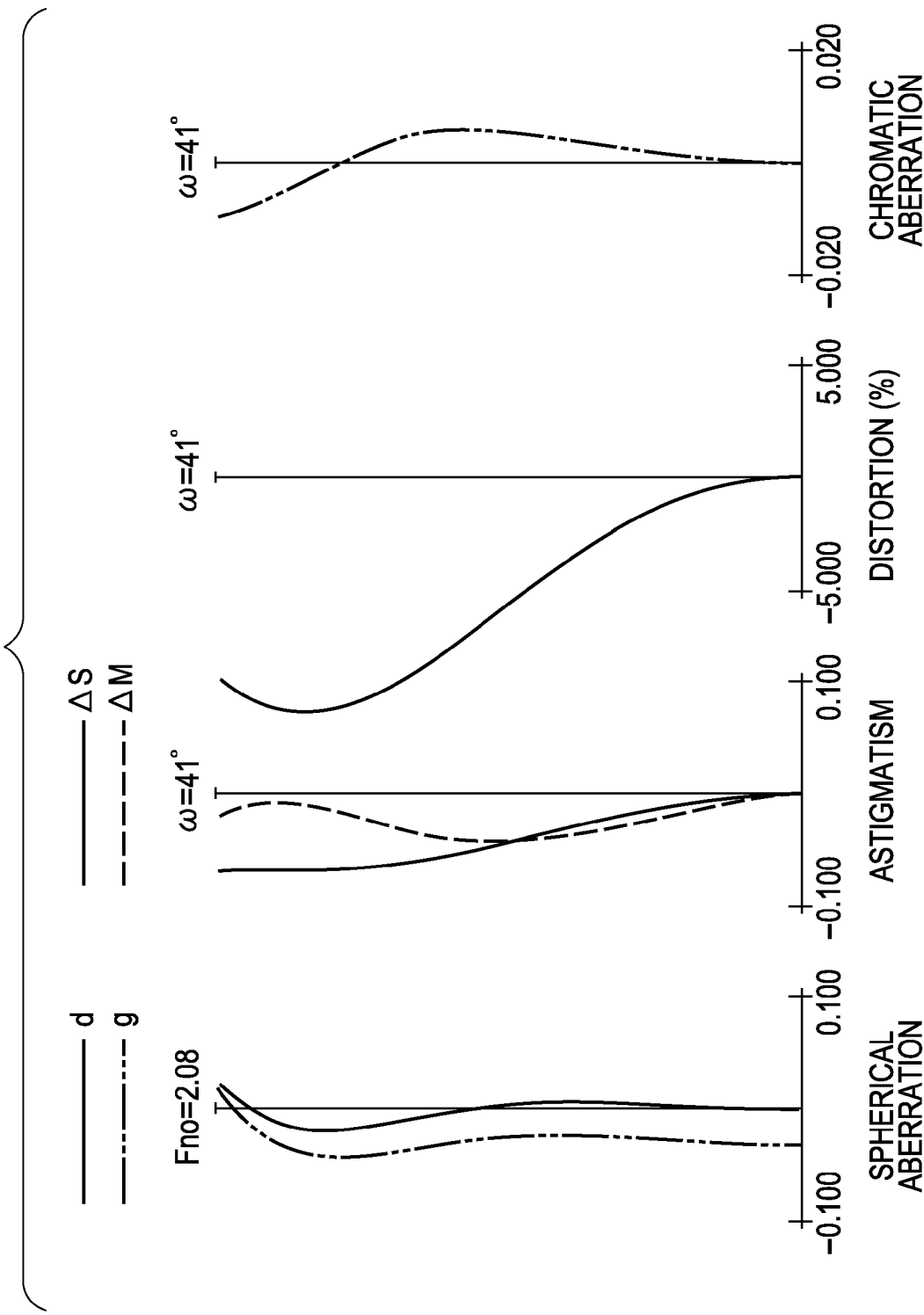

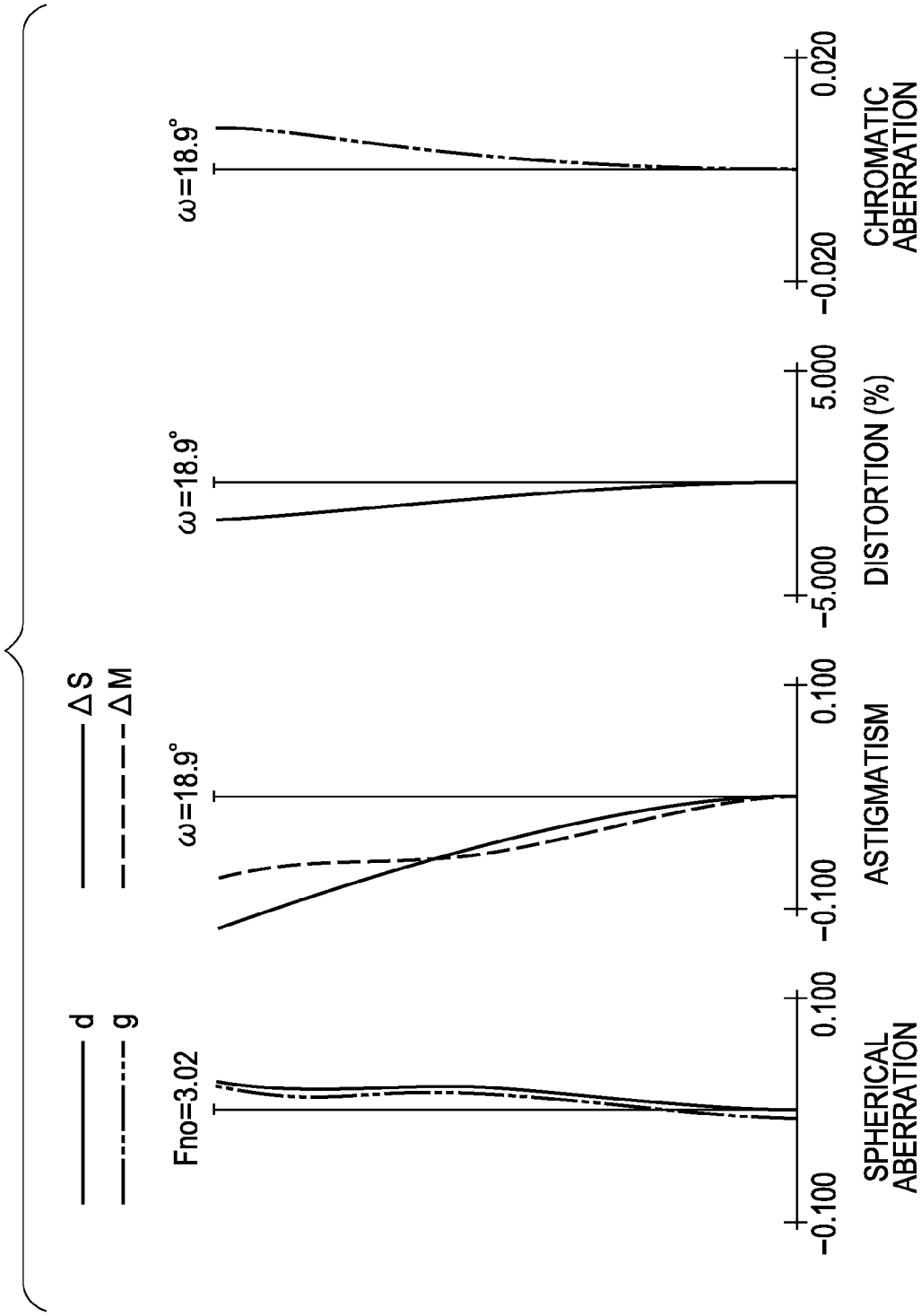

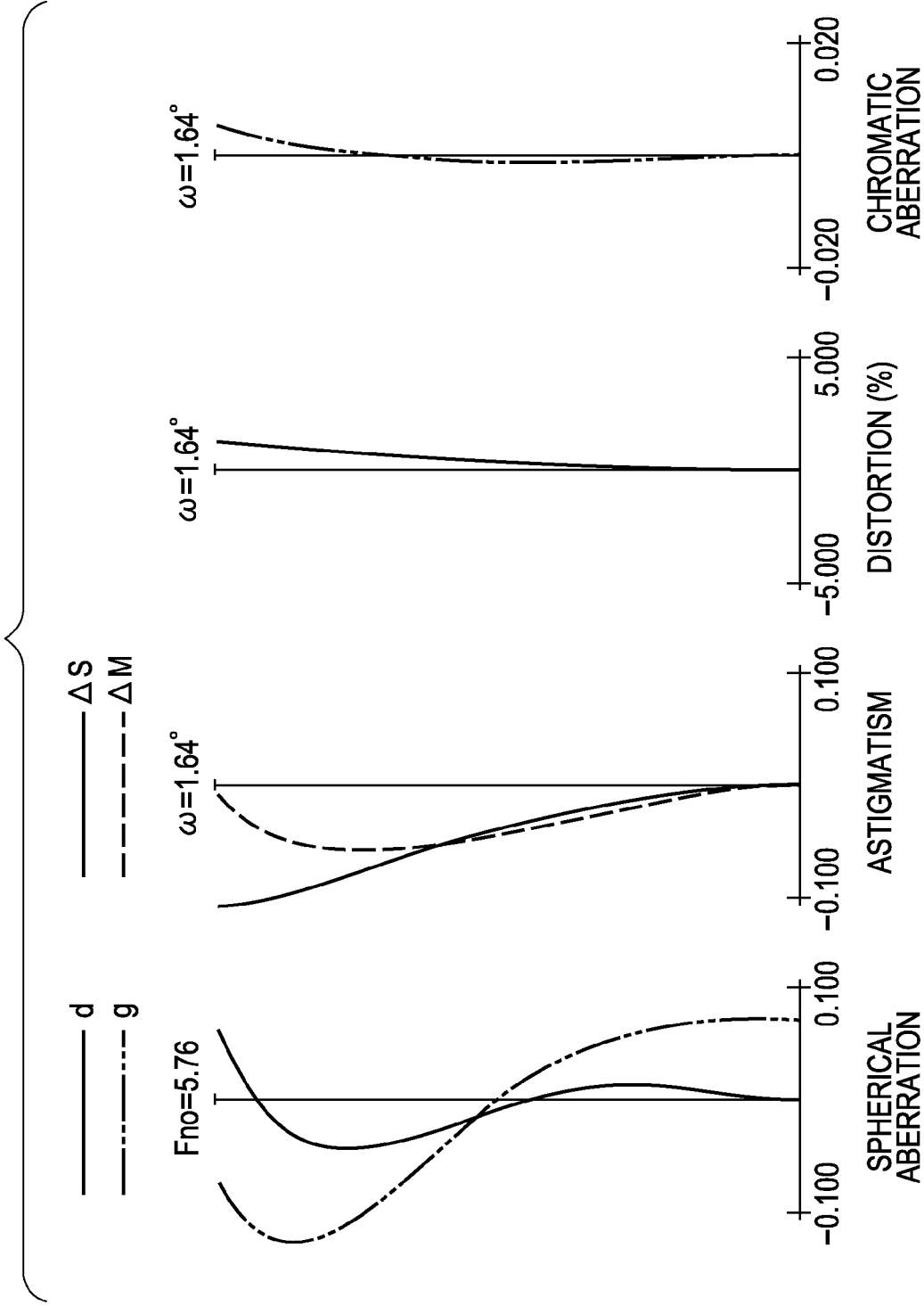

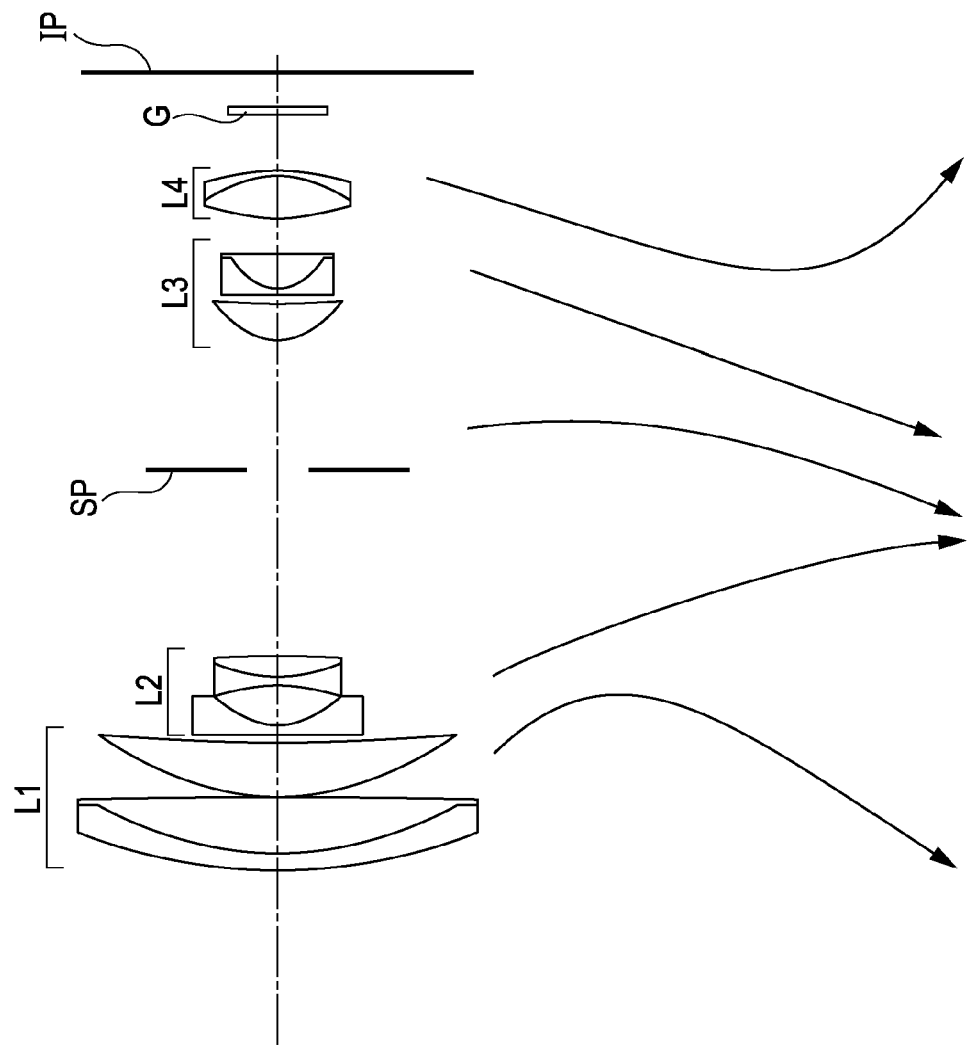

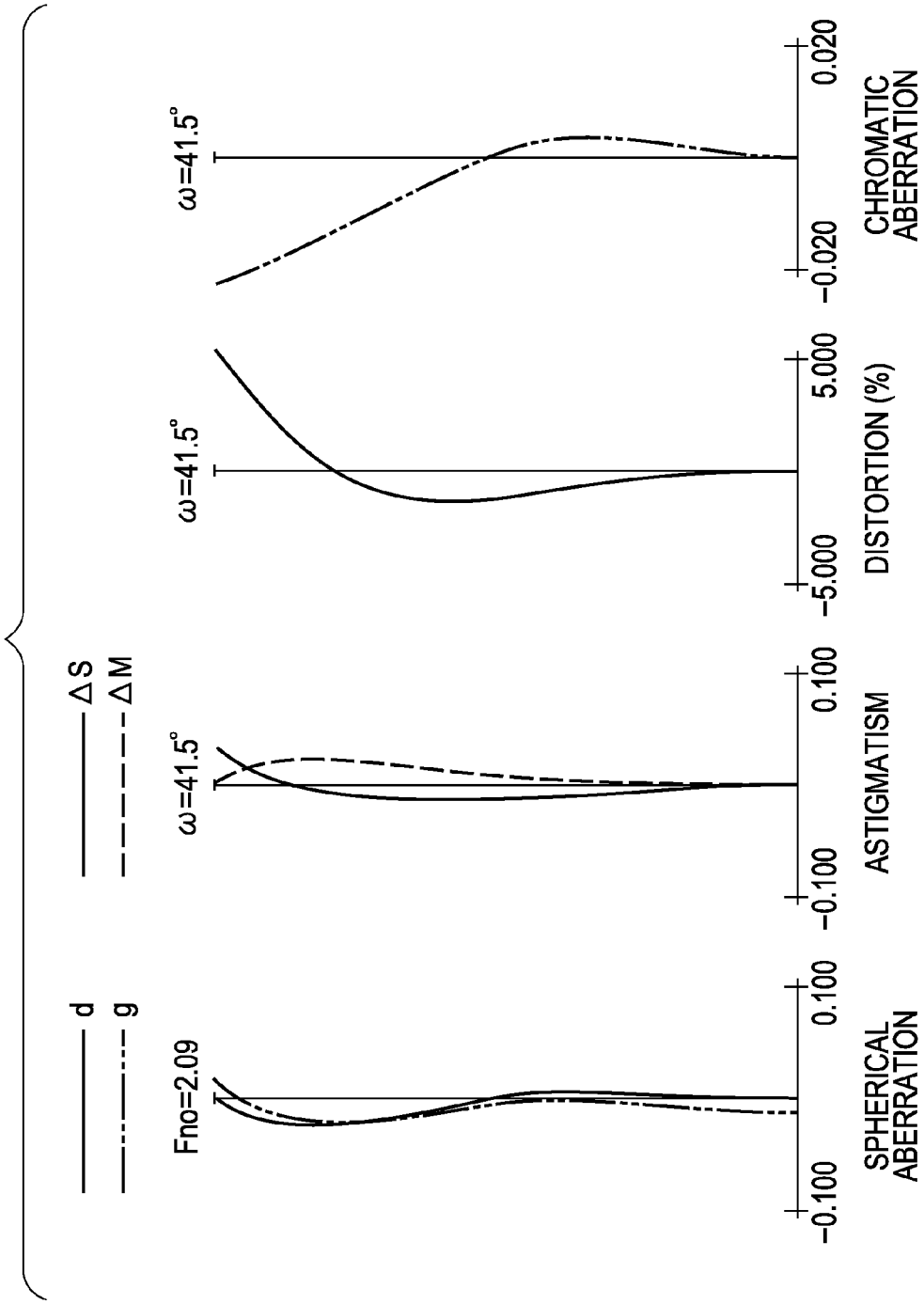

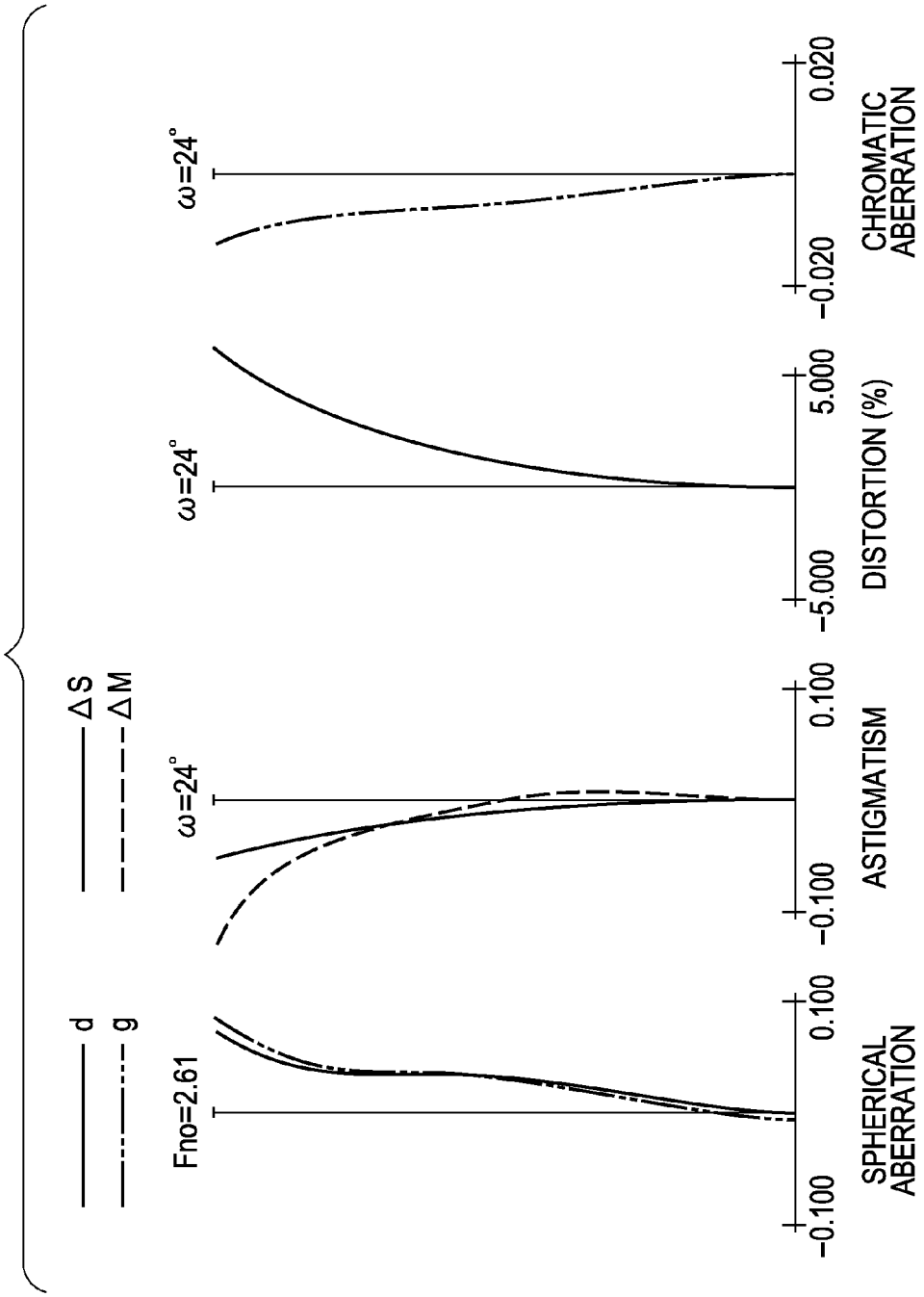

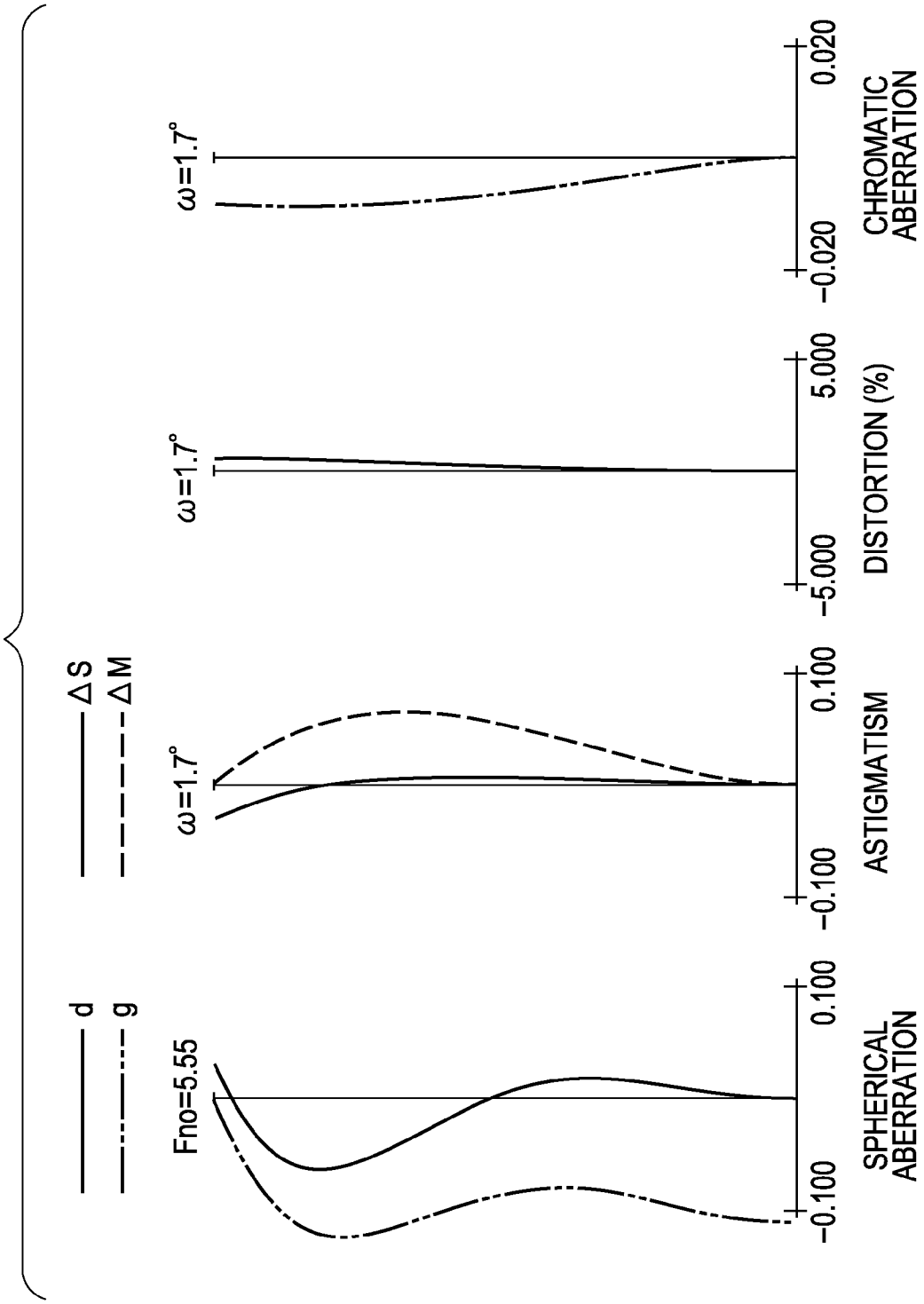

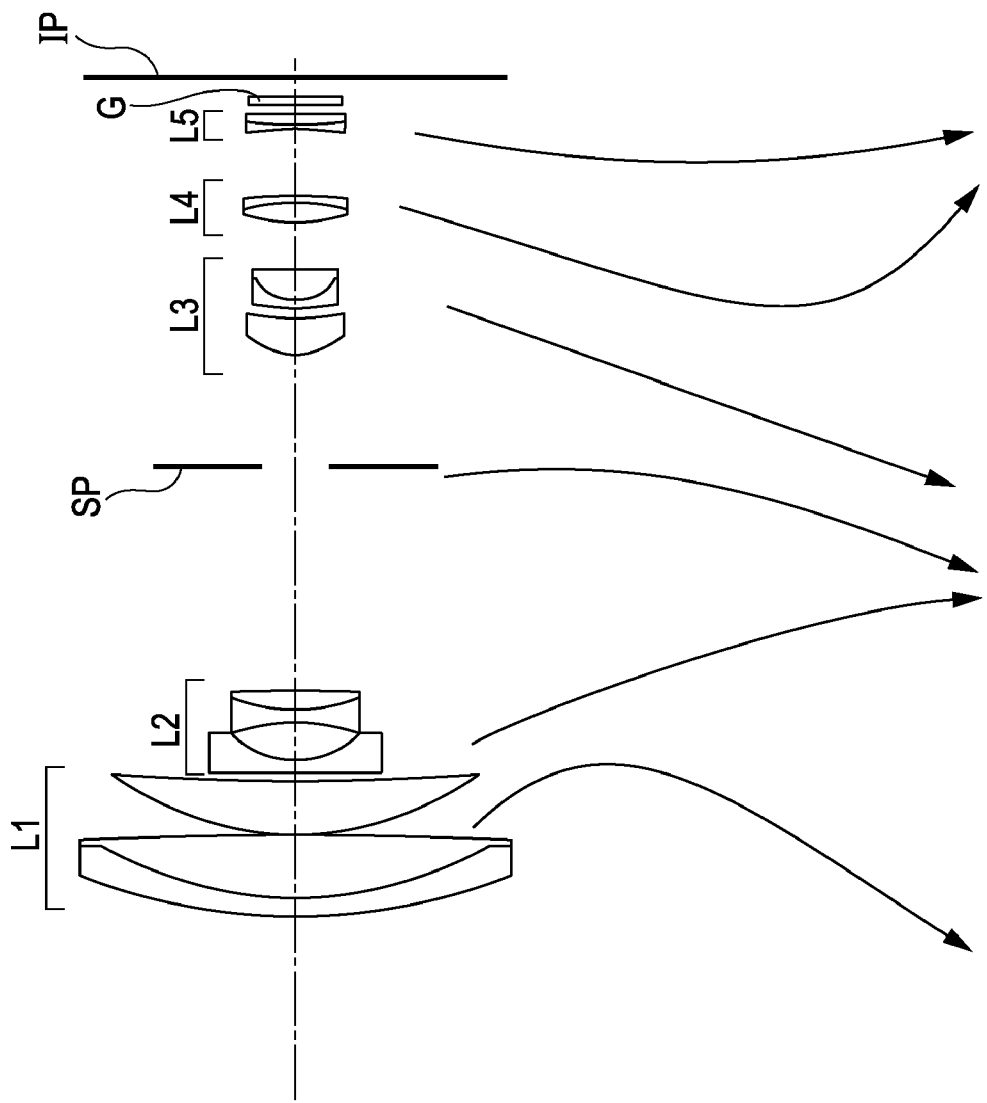

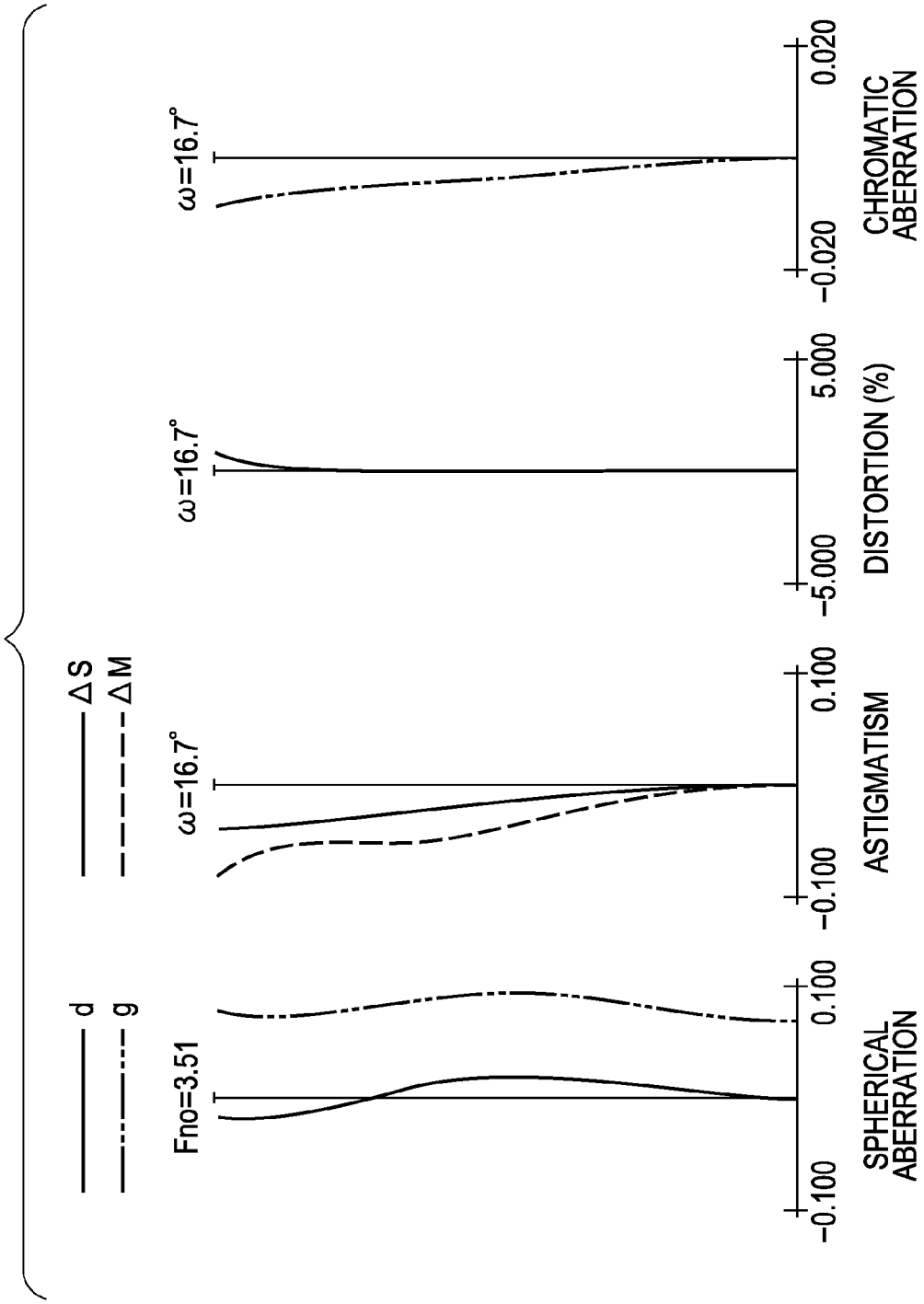

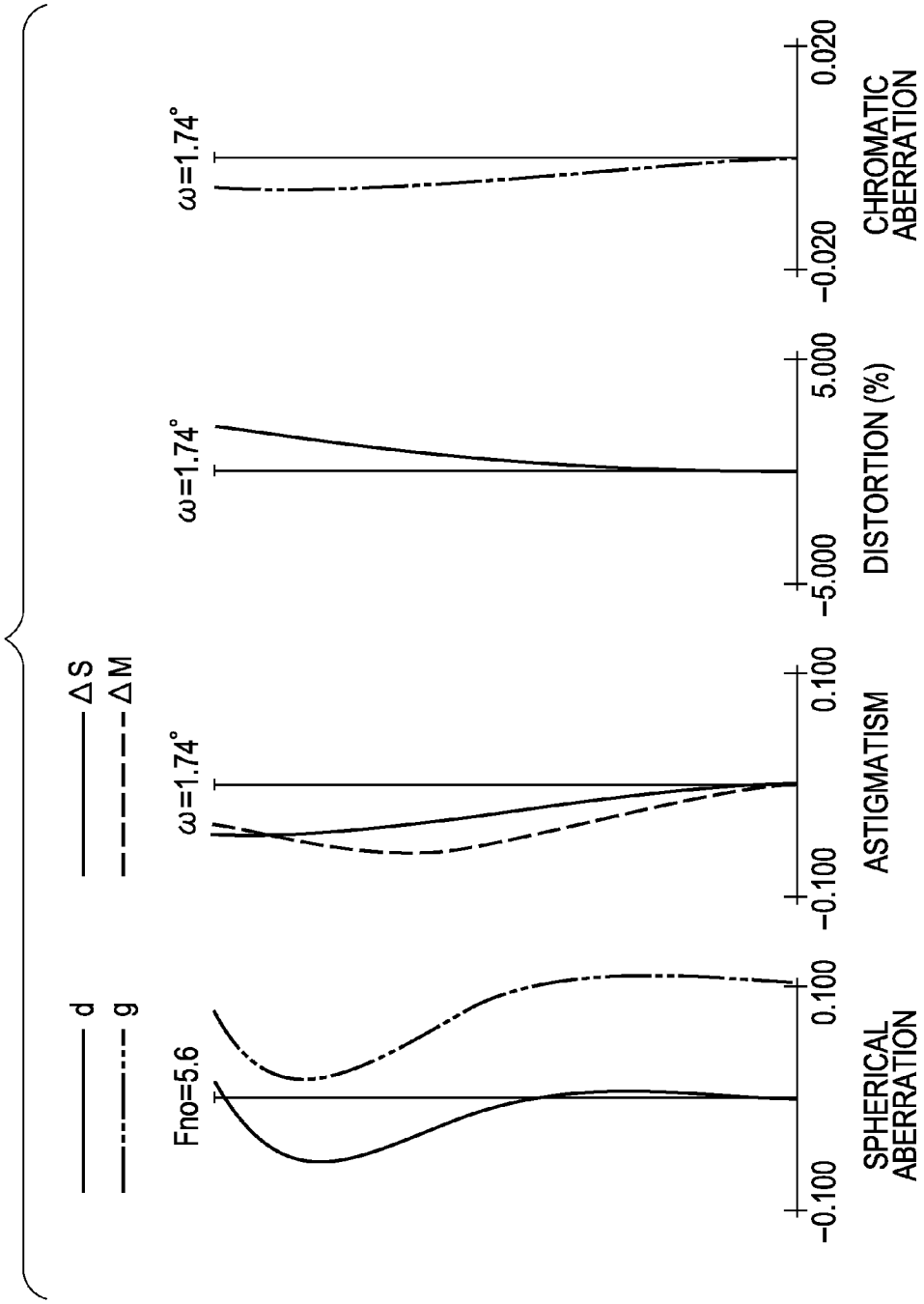

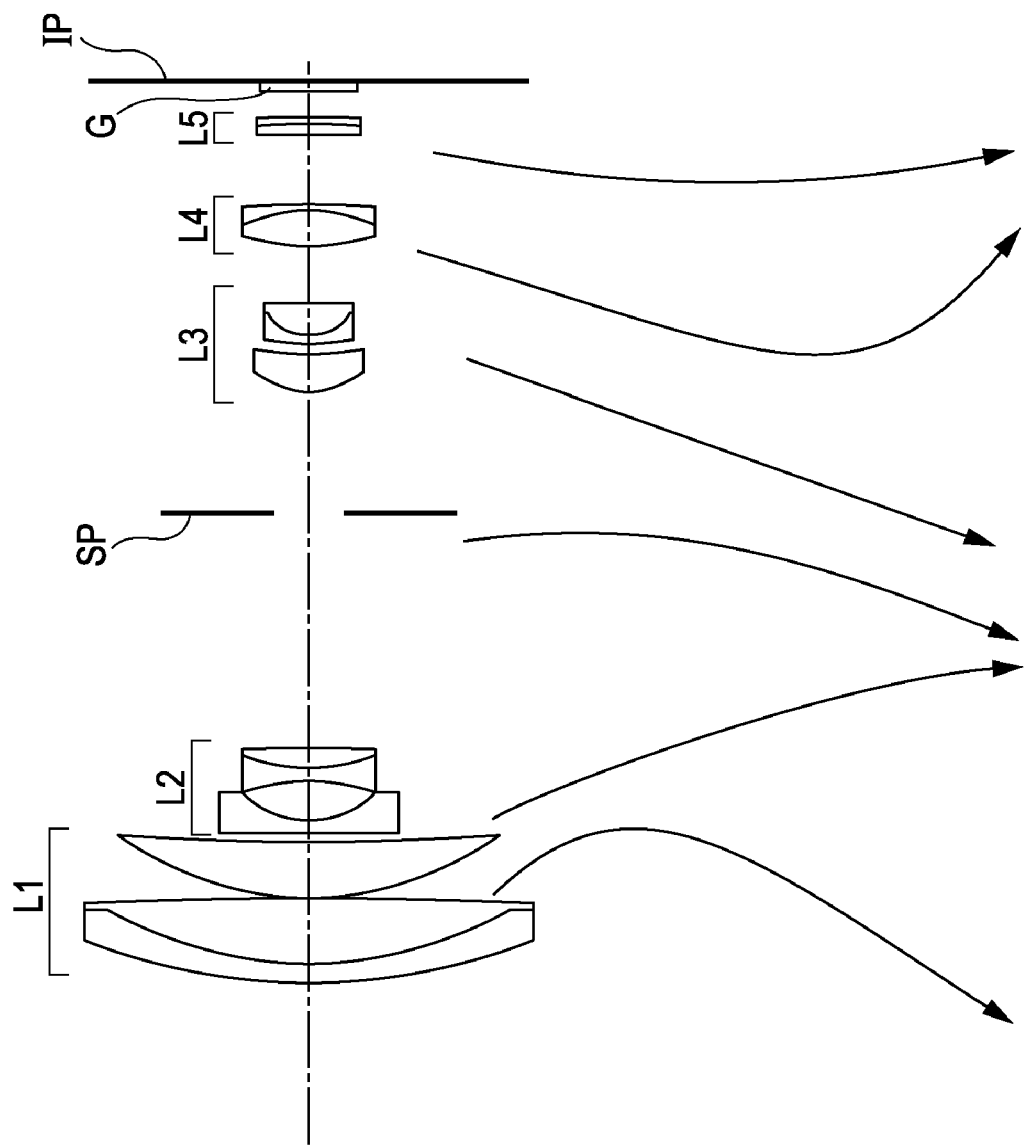

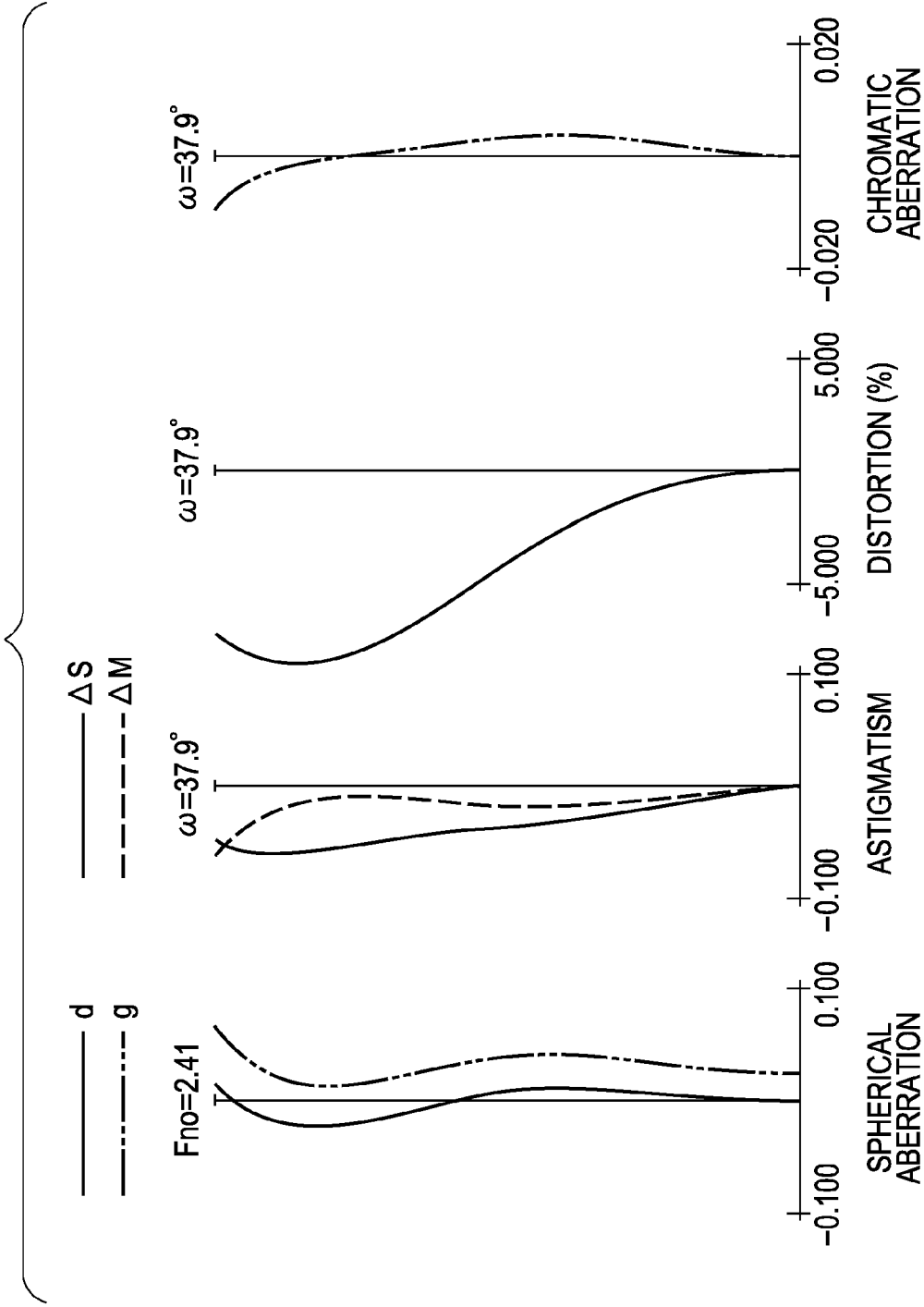

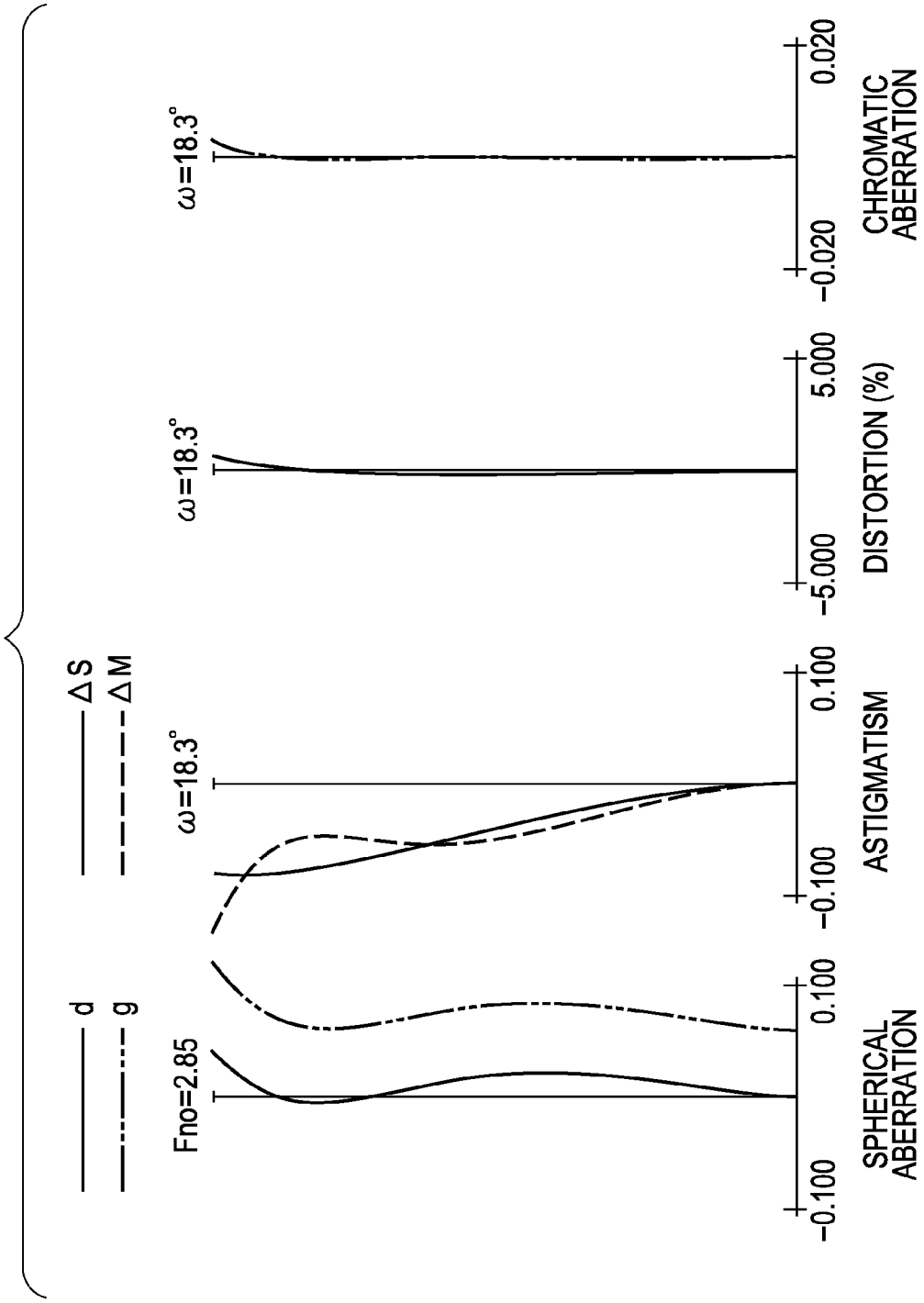

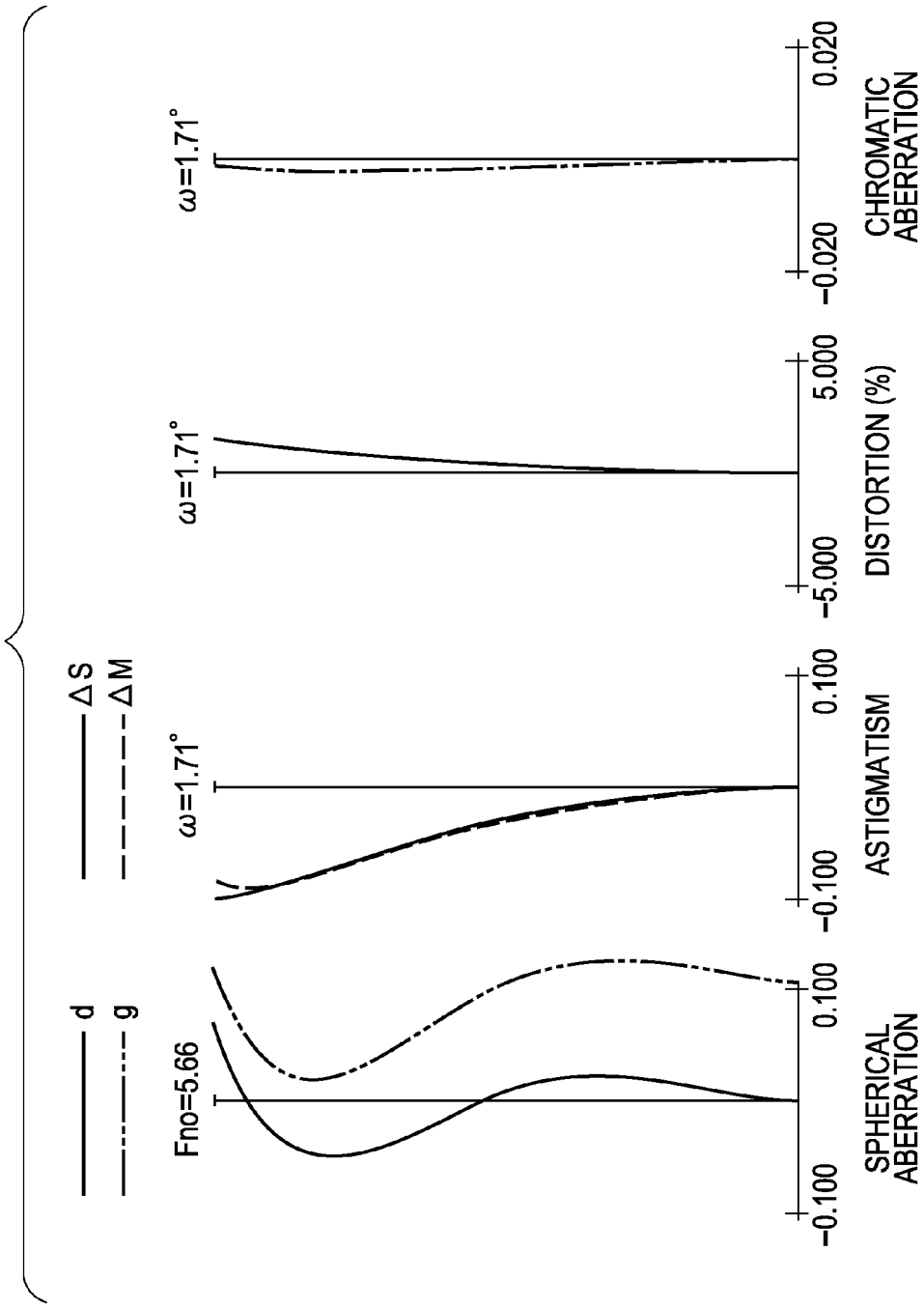

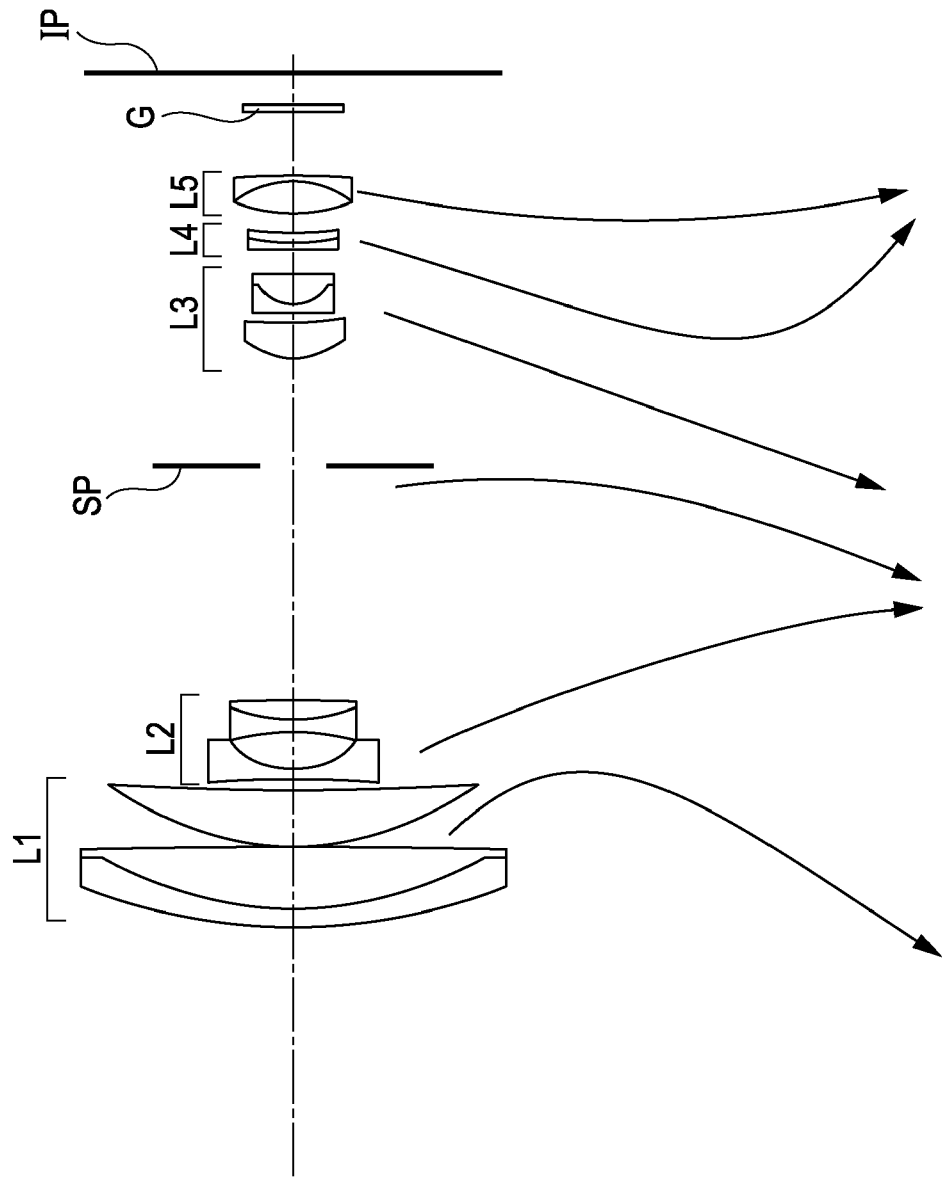

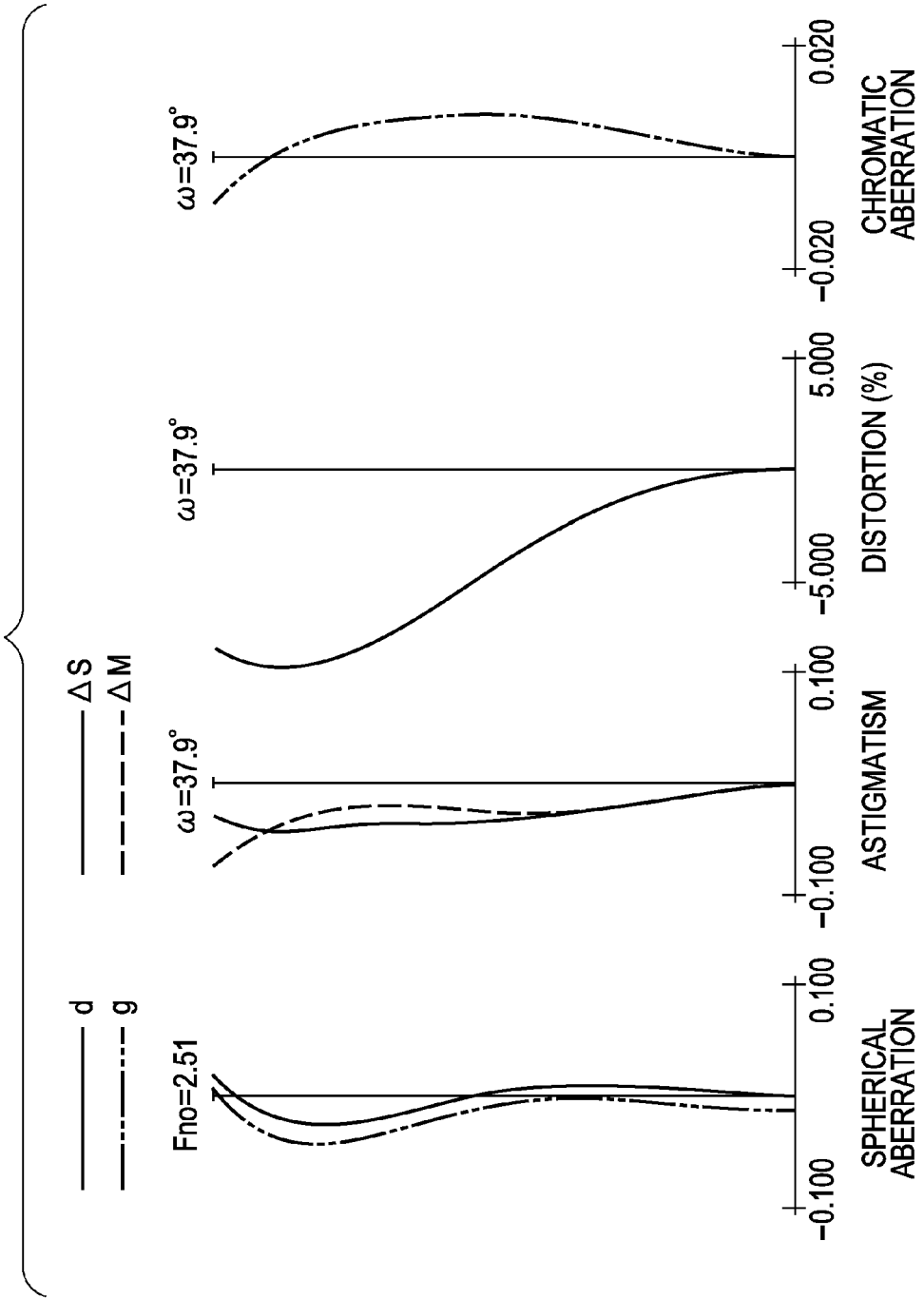

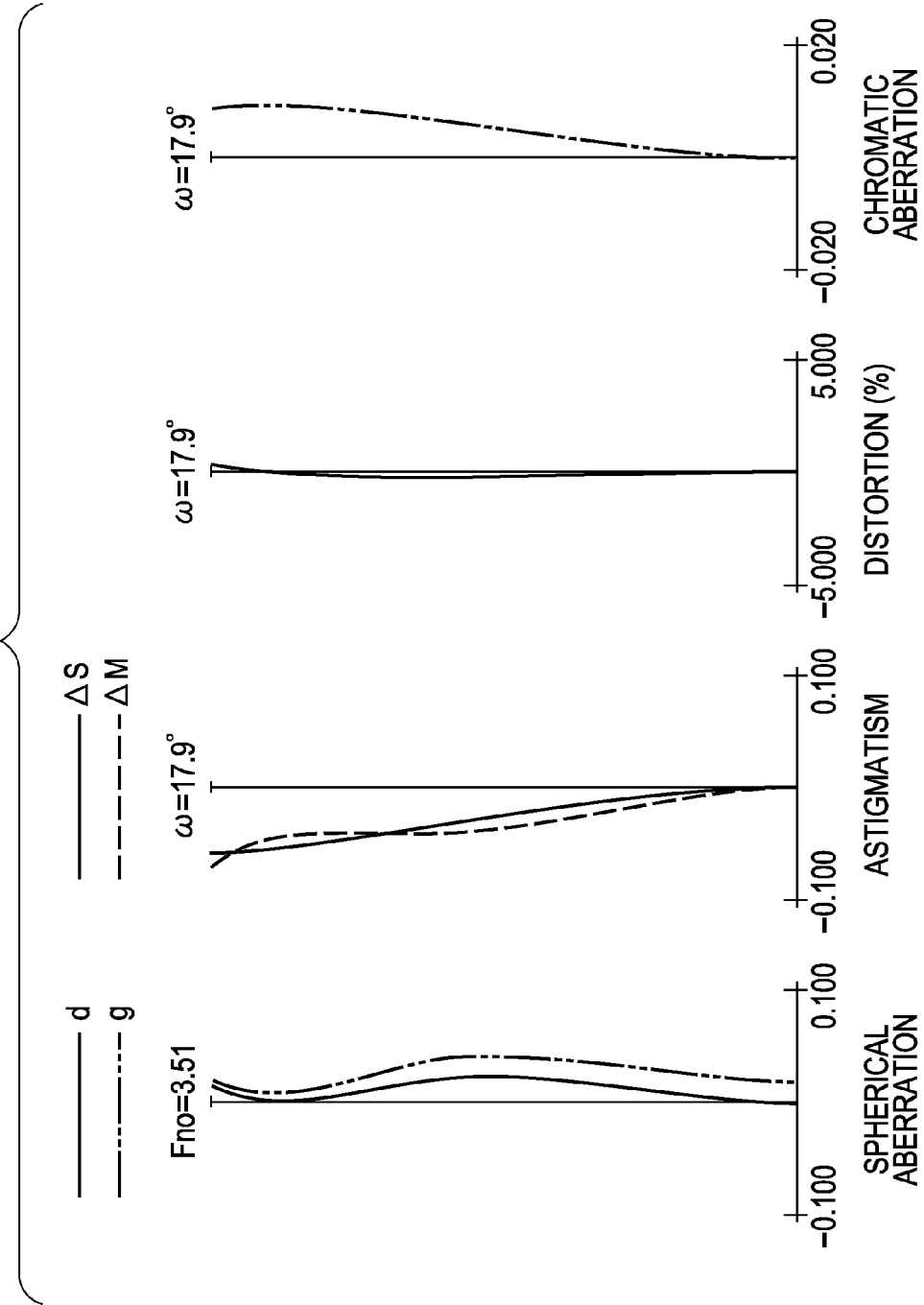

ZOOM LENS AND IMAGING DEVICE HAVING SAME

BACKGROUND OF THE INVENTION

1. Field of the Invention

The present invention relates to a zoom lens and an imaging device having the zoom lens, and is appropriate for an imaging device using a solid-state image pickup element, which includes a video camera, an electronic still camera, a broadcasting camera, a security camera, and so forth, and/or an imaging device including a camera using silver halide film, for example.

2. Description of the Related Art

In recent years, the imaging devices including the video camera, a digital still camera, the broadcasting camera, and the security camera that include the solid-state image pickup element, and the camera using the silver halide film, for example, have become multifunctional. Further, the entire devices have been downsized.

It is preferred that an imaging optical system used for the above-described devices be a zoom lens which is reduced in length, compact in size, and provided with a high zooming ratio (high magnification-varying ratio) and a high resolution.

Positive-lead type zoom lenses, which include a positive refractive-power lens group provided on the object side, have been known as zoom lenses satisfying the above-described demands.

A zoom lens including four lens groups of which refractive powers are positive, negative, positive, and positive in that order from the object side toward the image side has been known, as the positive-lead type zoom lens (U.S. Pat. No. 7,057,818).

A zoom lens including five lens groups of which refractive powers are positive, negative, positive, positive, and positive in that order from the object side toward the image side has been known (U.S. Pat. No. 7,286,304).

Further, a zoom lens including five lens groups of which refractive powers are positive, negative, positive, negative, and positive in that order from the object side toward the image side has been known (U.S. Pat. No. 6,594,087).

Usually, for downsizing the entire zoom lens while ensuring a high zooming ratio, the number of lenses should be decreased while increasing the refractive power of each of the lens groups included in the zoom lens.

According to the above-described zoom lens, however, as the refractive power of each lens surface increases, so does the thickness of each lens. At the same time, it becomes increasingly difficult to correct various aberrations.

For obtaining appropriate optical capabilities while attaining the high zooming ratio and downsizing the entire lens system for the above-described zoom lens including the four or five lens groups, the refractive power of each lens group and conditions under which each lens group is moved in association with zooming should be appropriately set.

Particularly, for obtaining high optical capabilities over the entire zooming range while ensuring a high zooming ratio approximately twenty times as large as the zooming ratio, conditions under which the first and second lens groups are moved in association with zooming, the refractive power of each of the first and second lens groups (the inverse of the focal length), and so forth should be appropriately set.

If the above-described configurations are inappropriately set, it becomes difficult to reduce the front size diameter, ensure a high zooming ratio, and obtain high optical capabilities throughout the entire zooming range.

For example, a moving stroke associated with zooming of a group of magnification-varying lenses becomes long, which makes it difficult to reduce the length of the lens and downsize the entire lens system.

SUMMARY OF THE INVENTION

The present invention provides a zoom lens including a first lens group having a positive refractive power, a second lens group having a negative refractive power, a third lens group having the positive refractive power, and a fourth lens group having either the positive refractive power or the negative refractive power. The first through the fourth lens group are arranged in that order from an object side toward an image side, wherein, in the zoom lens, the intervals between the lens groups are changed upon zooming, and wherein, when the focal length of the entire system at a wide angle end is fW, the focal length of the entire system at a telephoto end is fT, the focal length of the first lens group is f1, the focal length of the second lens group is f2, the distance between a position to which the first lens group moves upon zooming, the position being closest to the object side, and the position of the first lens group at the wide angle end is m1, and the difference between the largest distance between the first lens group and the second lens group upon zooming and the distance between the first and second lens groups at the wide angle end is X1, a condition represented by:

$$1.3 < f1/\sqrt{(fW \times fT)} < 2.0,$$

$$0.2 < |f2|/\sqrt{(fW \times fT)} < 0.4, \text{ and}$$

$$0.30 < m1/X1 < 0.75$$

is satisfied.

Further features of the present invention will become apparent from the following description of exemplary embodiments with reference to the attached drawings.

BRIEF DESCRIPTION OF THE DRAWINGS

FIG. 1 is a sectional view of lenses according to an embodiment of the present invention.

FIG. 2A shows aberrations occurring at the wide angle end of a zoom lens according to the above-described embodiment.

FIG. 2B shows aberrations occurring at the middle zooming position of the zoom lens according to the above-described embodiment.

FIG. 2C shows aberrations occurring at the telephoto end of the zoom lens according to the above-described embodiment.

FIG. 3 is a sectional view of lenses according to another embodiment of the present invention.

FIG. 4A shows aberrations occurring at the wide angle end of a zoom lens according to the above-described embodiment.

FIG. 4B shows aberrations occurring at the middle zooming position of the zoom lens according to the above-described embodiment.

FIG. 4C shows aberrations occurring at the telephoto end of the zoom lens according to the above-described embodiment.

FIG. 5 is a sectional view of lenses according to another embodiment of the present invention.

FIG. 6A shows aberrations occurring at the wide angle end of a zoom lens according to the above-described embodiment.

FIG. 6B shows aberrations occurring at the middle zooming position of the zoom lens according to the above-described embodiment.

FIG. 6C shows aberrations occurring at the telephoto end of the zoom lens according to the above-described embodiment.

FIG. 7 is a sectional view of lenses according to another embodiment of the present invention.

FIG. 8B shows aberrations occurring at the middle zooming position of the zoom lens according to the above-described embodiment.

FIG. 8C shows aberrations occurring at the telephoto end of the zoom lens according to the above-described embodiment.

FIG. 9 is a sectional view of lenses according to another embodiment of the present invention.

FIG. 10A shows aberrations occurring at the wide angle end of a zoom lens according to the above-described embodiment.

FIG. 10B shows aberrations occurring at the middle zooming position of the zoom lens according to the above-described embodiment.

FIG. 10C shows aberrations occurring at the telephoto end of the zoom lens according to the above-described embodiment.

FIG. 11 is a sectional view of lenses according to another embodiment of the present invention.

FIG. 12A shows aberrations occurring at the wide angle end of a zoom lens according to the above-described embodiment.

FIG. 12B shows aberrations occurring at the middle zooming position of the zoom lens according to the above-described embodiment.

DESCRIPTION OF THE EMBODIMENTS

The present invention provides a downsized zoom lens that has a high zooming ratio and a small front lens diameter, and that attains high optical capabilities throughout the entire zooming range, and an imaging device having the zoom lens.

Hereinafter, zoom lenses and imaging devices having the zoom lenses according to embodiments of the present invention will be described.

Each of the above-described zoom lenses has at least four lens groups including the first lens group having positive refractive power (optical power=the inverse of the focal length), the second lens group having negative refractive power, the third lens group having positive refractive power, and the fourth lens group having positive refractive power and/or negative refractive power. Further, the distances between the lens groups are changed upon zooming. Preferably, each of the first to fourth lens groups (all of the lens groups) moves upon zooming.

FIG. 1 is a sectional view of a zoom lens according to a first embodiment of the present invention. FIG. 2A shows aberrations occurring at the wide angle end (short focal-length end) of the zoom lens, FIG. 2B shows aberrations occurring at the middle zooming position of the zoom lens, and FIG. 2C shows aberrations occurring at the telephoto end (long focal-length end) of the zoom lens.

FIG. 3 is a sectional view of a zoom lens according to a second embodiment of the present invention. FIG. 4A shows aberrations occurring at the wide angle end of the zoom lens, FIG. 4B shows aberrations occurring at the middle zooming position of the zoom lens, and FIG. 4C shows aberrations occurring at the telephoto end of the zoom lens.

FIG. 5 is a sectional view of a zoom lens according to a third embodiment of the present invention. FIG. 6A shows aberrations occurring at the wide angle end of the zoom lens, FIG. 6B shows aberrations occurring at the middle zooming position of the zoom lens, and FIG. 6C shows aberrations occurring at the telephoto end of the zoom lens.

Figure 8A:
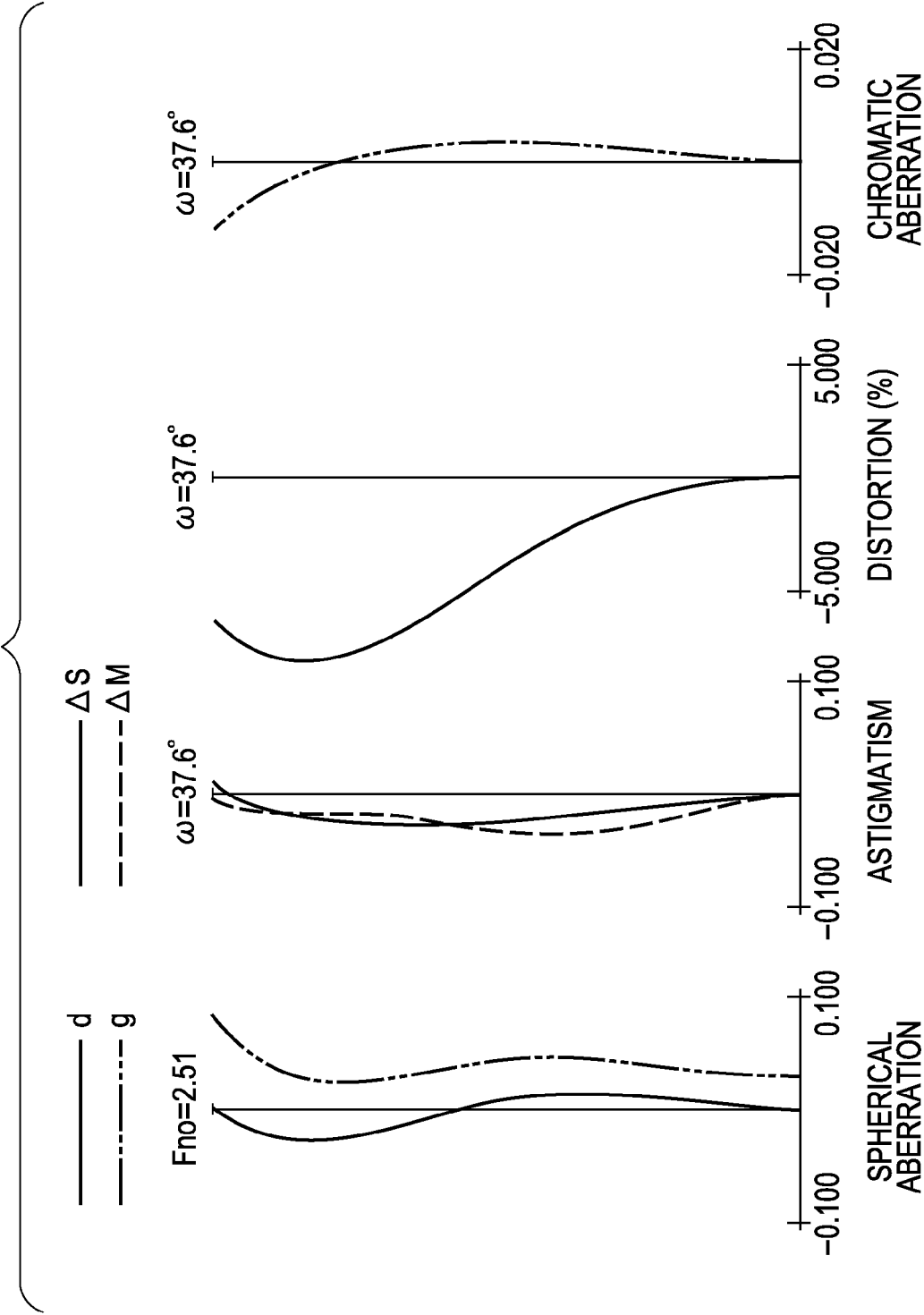
FIG. 8A shows aberrations occurring at the wide angle end of a zoom lens according to the above-described embodiment.

FIG. 7 is a sectional view of a zoom lens according to a fourth embodiment of the present invention. FIG. 8A shows aberrations occurring at the wide angle end of the zoom lens, FIG. 8B shows aberrations occurring at the middle zooming position of the zoom lens, and FIG. 8C shows aberrations occurring at the telephoto end of the zoom lens.

FIG. 9 is a sectional view of a zoom lens according to a fifth embodiment of the present invention. FIG. 10A shows aberrations occurring at the wide angle end of the zoom lens, FIG. 10B shows aberrations occurring at the middle zooming position of the zoom lens, and FIG. 10C shows aberrations occurring at the telephoto end of the zoom lens.

Figure 12C:
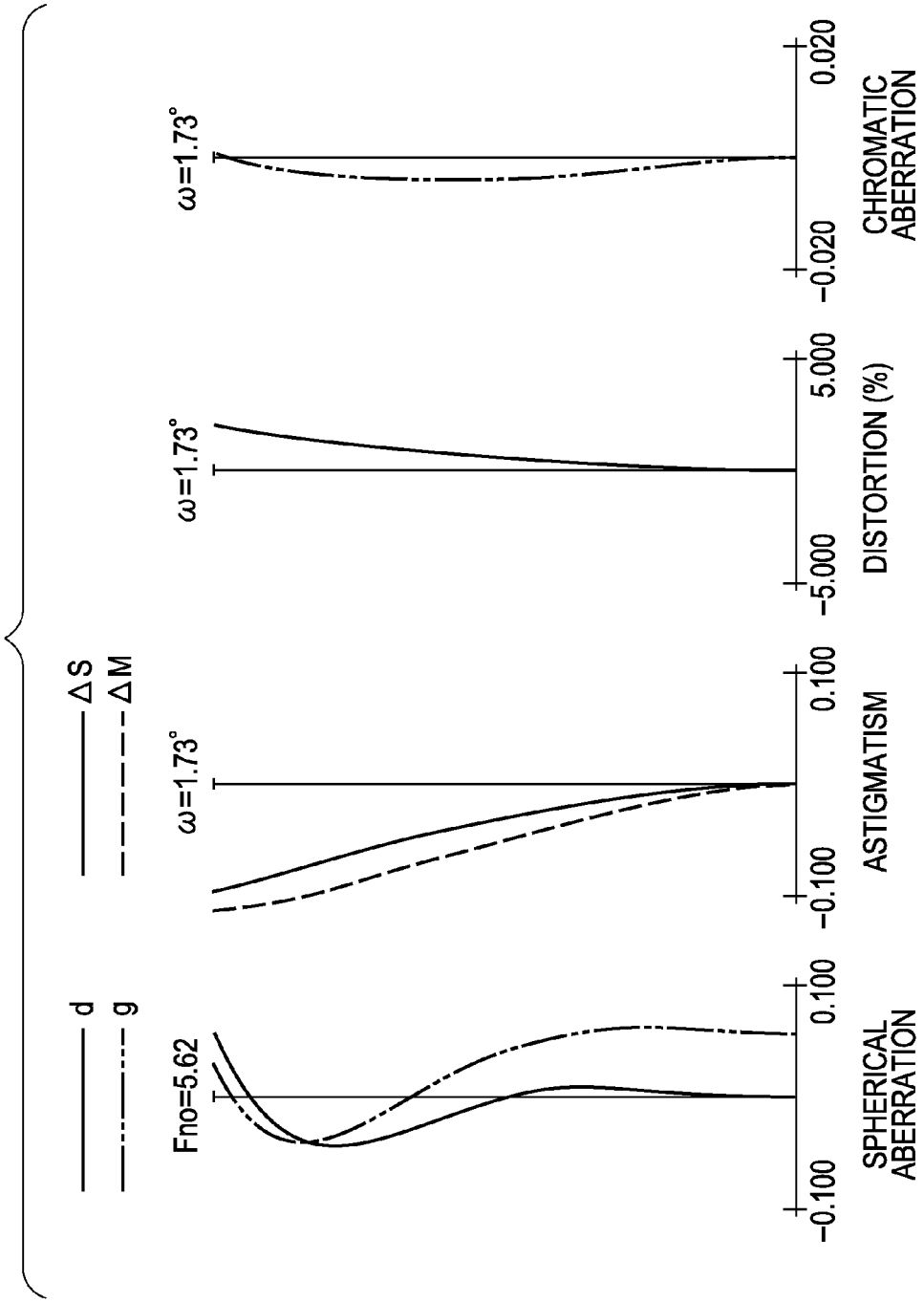
FIG. 12C shows aberrations occurring at the telephoto end of the zoom lens according to the above-described embodiment.

FIG. 11 is a sectional view of a zoom lens according to a sixth embodiment of the present invention. FIG. 12A shows aberrations occurring at the wide angle end of the zoom lens, FIG. 12B shows aberrations occurring at the middle zooming position of the zoom lens, and FIG. 12C shows aberrations occurring at the telephoto end of the zoom lens.

Figure 13:
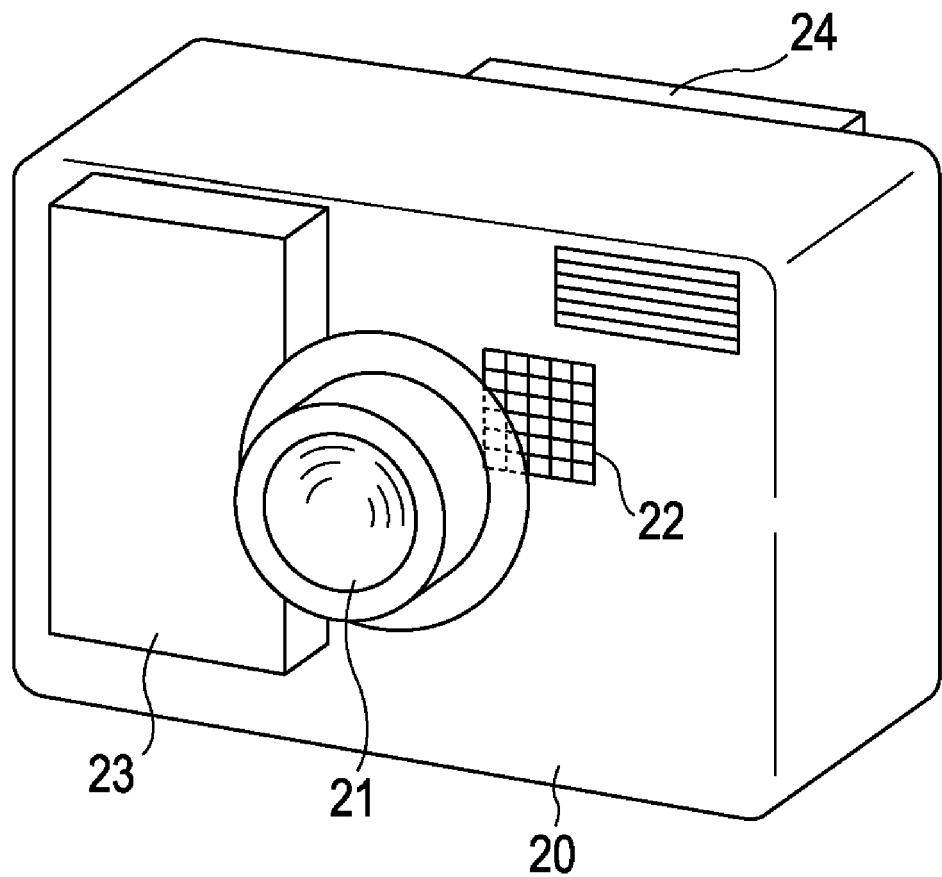
FIG. 13 is a schematic diagram of the main parts of an imaging device according to another embodiment of the present invention.

FIG. 13 is a schematic diagram of the main parts of a camera (an imaging device) including a zoom lens according to an embodiment of the present invention. The zoom lens according to each of the embodiments is an imaging lens system used for an imaging device including a video camera, a digital camera, a silver-halide-film camera, and so forth.

In the lens sectional view, the left side shows the object side (the front) and the right side shows the image side (the rear). In the lens sectional view, the sign i denotes the order in which the lens groups are arranged from the object side and the sign Li denotes the i-th lens group.

In each of the lens sectional views of FIGS. 1, 3, and 5, the sign L1 denotes the first lens group having the positive refractive power, the sign L2 denotes the second lens group having the negative refractive power, the sign L3 denotes the third lens group having the positive refractive power, and the sign L4 shows the fourth lens group having the positive refractive power.

In the lens sectional view of FIG. 7, the sign L1 denotes the first lens group having the positive refractive power, the sign L2 denotes the second lens group having the negative refractive power, the sign L3 denotes the third lens group having the positive refractive power, the sign L4 denotes the fourth lens group having the positive refractive power, and the sign L5 denotes the fifth lens group having the negative refractive power.

In the lens sectional view of FIG. 9, the sign L1 denotes the first lens group having the positive refractive power, the sign L2 denotes the second lens group having the negative refractive power, the sign L3 denotes the third lens group having the positive refractive power, the sign L4 denotes the fourth lens group having the positive refractive power, and the sign L5 denotes the fifth lens group having the positive refractive power.

In the lens sectional view of FIG. 11, the sign L1 denotes the first lens group having the positive refractive power, the sign L2 denotes the second lens group having the negative refractive power, the sign L3 denotes the third lens group having the positive refractive power, the sign L4 denotes the fourth lens group having the negative refractive power, and the sign L5 denotes the fifth lens group having the positive refractive power.

In each of the lens sectional views, the sign SP denotes an aperture stop provided between the second lens group L2 and the third lens group L3.

The sign G denotes the optical block corresponding to an optical filter, a faceplate, a crystal optical low-pass filter, an infrared cut filter, and so forth.

The sign IP denotes an image plane. When the zoom lens is used as the imaging optical system of a video camera and/or a digital still camera, the image plane IP corresponds to the imaging plane (photosensitive surface) of a solid-state image pickup element (photoelectric conversion element) including a charge-coupled device (CCD) sensor, a complementary metal oxide semiconductor (CMOS) sensor, and so forth. The above-described solid-state image pickup element includes the CCD sensor, the CMOS sensor, and so forth. When the zoom lens is used as the imaging optical system of a silver-halide film camera, the image plane IP corresponds to the film surface (photosensitive surface).

In each of aberration diagrams, the signs d and g denote the individual lines d and g. The sign ΔM denotes a meriodinal image plane and the sign ΔS denotes a sagital image plane. The chromatic aberration of magnification is represented by the line g. The sign ω denotes a half field angle, and the sign Fno denotes an F number.

In each of the following embodiments, the wide angle end and the telephoto end denote the positions of zooming performed when the magnification-varying-lens group is positioned at each of the ends of the range of an optical axis on which the magnification-varying-lens group can move as the mechanism allows.

In each of the embodiments, the lens groups move as indicated by arrows upon zooming from the wide angle end to the telephoto end.

More specifically, upon zooming from the wide angle end to the telephoto end, the first lens group L1 moves toward the image side, and moves toward the object side. That is to say, the first lens group L1 moves while drawing a locus convex toward the image side (along a curved line convex toward the image side).

At that time, the first lens group L1 is moved so that the position of the first lens group L1 provided at the telephoto end is closer to the object side than the position of the first lens group L1 provided at the wide angle end is.

While zooming from the wide angle end to the telephoto end, the second lens group L2 moves toward the image side, and the third lens group L3 moves toward the object side.

While zooming from the wide angle end to the telephoto end, the fourth lens group L4 moves while drawing a locus convex toward the object side, so as to correct fluctuations in the image-plane position (compensate fluctuation of the image-plane position) associated with magnification variations. Namely, when the variable magnification is performed through the zoom lens of the above-described embodiment, the fourth lens group L4 is moved so as to reduce a change in the image-plane position, the change being caused mainly by the movement of each of the second lens group and the third lens group that are provided mainly for achieving the variable magnification function.

According to the fourth, fifth, and sixth embodiments of the present invention, in which the zoom lens includes the five lens groups, the fifth lens group L5 moves while drawing a locus convex toward the object side.

Further, a rear-focusing system is used in the above-described embodiments so that focusing is performed by moving the fourth lens group L4 on the optical axis (in the optical-axis direction).

Upon focusing from an object at infinity to a near object, the fourth lens group L4 shown in the lens sectional view is moved toward the object side (the front).

Further, in the fourth to sixth embodiments in which the zoom lens includes the five lens groups, focusing may be performed by moving the fifth lens group L5.

In each of the embodiments, the focal length of the entire system at the wide angle end is indicated by the sign fW and that of the entire system at the telephoto end is indicated by the sign fT. Further, the focal length of the first lens group L1 is indicated by the sign f1 and that of the second lens group L2 is indicated by the sign f2.

Upon zooming, the first lens group L1 moves to various positions. The distance between the nearest position to the object side of all the above-described positions and the position of the first lens group at the angle wide end (hereinafter, the distance is an interval in a direction parallel to the optical axis) is indicated by the sign m1. The difference between the largest distance between the first and second lens groups L1 and L2 upon zooming, and that between the first and second lens groups L1 and L2 at the wide angle end is indicated by the sign X1. At that time, conditions indicated by:

$$1.3 < f1/\sqrt{(fW \times fT)} < 2.0 \quad \text{Expression 1,}$$

$$0.2 < |f2|/\sqrt{(fW \times fT)} < 0.4 \quad \text{Expression 2, and}$$

$$0.30 < m1/X1 < 0.75 \quad \text{Expression 3}$$

are satisfied.

The condition expression (1) determines the ratio between the focal length of the first lens group L1 and the focal length obtained at a representative zooming position between the wide angle end and the telephoto end.

The condition expression (2) determines the ratio between the focal length of the second lens group L2 and the focal length obtained at the representative zooming position.

The condition expression (3) relates to the ratio between the difference m1 and the difference X1. As described above, the difference m1 is the difference between the position to which the first lens group L1 moves at the zooming time, the position being the nearest to the object side of all the positions to which the first lens group L1 moves, and the position of the first lens group L1 at the wide angle end. Further, the difference X1 is the difference between the distance corresponding to the largest interval between the first and second lens groups L1 and L2 at the zooming time, and the distance between the first and second lens groups L1 and L2 at the wide angle end.

According to many zooming systems using a zoom lens including at least three lens groups having the positive refractive power, the negative refractive power, and the positive refractive power in that order from the object side, the second lens group L2 which is usually a variator (a group of magnification-varying lenses) is moved toward the image side so that the magnification variation is attained.

For obtaining a high zooming ratio, the zoom lens should be arranged so that the first and second lens groups L1 and L2 are extended at the telephoto end.

If the distance between the principal points of the first and second lens groups L1 and L2 is indicated by the sign D, the variable magnification ratio β (<0) of the second lens group L2 is represented by the following equation.

$$\beta = f2/(f1 - D + f2) \quad \text{Equation (A)}$$

At that time, the combined focal length f12 of a system including the first and second lens groups L1 and L2 is indicated by f1×β.

The principal-point distance D should be reduced, so as to downsize the entire lens system and reduce the lens length (the distance between the first lens surface and the image plane). As is clear from Equation (A), the value of each of the focal lengths f1 and f2 should be reduced at the same time as when the principal-point distance D is decreased, so as to keep the zooming ratio constant.

The condition expressions (1) and (2) are provided to satisfy the above-described conditions. When the focal length of the first lens group L1 goes beyond the upper limit of the condition expression (1) and becomes long in regard to that of the representative zooming position of the zoom lens, the length of a stroke (moving amount) occurring at the zooming time is increased, which is not appropriate for downsizing the lens system.

When the focal length of the first lens group L1 is decreased, going beyond the lower limit of the condition expression (1), the number of lenses included in the first lens group L1 should be increased, so as to keep the optical capabilities in appropriate condition when the zooming ratio is increased. Consequently, the entire lens system is increased in size.

When the focal length of the second lens group L2 goes beyond the upper limit of the condition expression (2) and becomes long in regard to that of the representative zooming position, the stroke length should be increased, so as to increase the zooming ratio. Consequently, it becomes difficult to downsize the entire lens system.

When the focal length of the second lens group L2 goes beyond the lower limit of the condition expression (2) and becomes short in regard to that obtained at the representative zooming position, the number of lenses included in the second lens group L2 should be increased, so as to keep the optical capabilities in appropriate condition, which makes it difficult to downsize the entire lens system.

As is clear from Equation (A), the variable magnification ratio of an optical system including two lens groups including the first and second lens groups L1 and L2 depends only on the focal length of each of the first and second lens groups L1 and L2, and the relative position relationship between the first and second lens groups L1 and L2.

However, when the zoom lens includes at least three lens groups, the absolute positions of the first and second lens groups and the position of the aperture stop significantly affect the zoom ratio and the effective diameter of the zoom lens.

For example, when the first lens group having the positive refractive power is fixed, the second lens group having the negative refractive power is moved toward the image side so that the variable magnification ratio can be increased. However, the distance from the aperture stop is increased near the wide angle end. Consequently, the effective diameter tends to increase.

Further, in that case, the image point generated by the second lens group is often positioned on the object side. Therefore, it is difficult to obtain a high variable magnification ratio without increasing a moving stroke of the third lens group associated with zooming.

When the second lens group having the negative refractive power is fixed at the zooming time, the first lens group having the positive refractive power moves toward the object side so that the variable magnification ratio can be increased.

In that case, the distance from the aperture stop is decreased near the wide angle end. Therefore, the effective diameter tends to decrease.

However, the first lens group significantly moves toward the object side at the telephoto end. Therefore, the length of the zoom lens having a high zooming ratio tends to increase, which makes it difficult to downsize the lens system.

Assuming that the maximum moving amount of the first lens group L1 becomes large in relation to a change in the maximum interval between the first and second lens groups L1 and L2, going beyond the upper limit of the condition expression (3), the first lens group L1 significantly moves toward the object side at the telephoto end, so as to obtain a high zooming ratio (high variable magnification ratio). Consequently, the length of the lens is increased.

If the maximum moving amount of the first lens group L1 becomes small in relation to a change in the maximum interval between the first and second lens groups L1 and L2, going beyond the lower limit of the condition expression (3), it becomes difficult to downsize the entire lens system.

The values of the condition expressions (1), (2), and (3) should fall within the following numerical value ranges.

$$1.4 < f1/\sqrt{(fW \times fT)} < 2.1 \quad \text{Expression (1a)}$$

$$0.25 < |f2|/\sqrt{(fW \times fT)} < 0.36 \quad \text{Expression (2a)}$$

$$0.30 < m1/X1 < 0.72 \quad \text{Expression (3a)}$$

The above-described configurations are specified according to an embodiment of the present invention. Therefore, it becomes possible to obtain a downsized positive-lead type zoom lens having a wide angle of view and a high zooming ratio. According to the above-described zoom lens, aberrations are appropriately corrected throughout the zooming range and the front lens diameter is reduced.

According to an embodiment of the present invention, at least one of the following condition expressions (4), (5), (6), (7), and (8) should be satisfied.

A zooming ratio Z is expressed by the following equation:

$$Z = fT/fW.$$

At that time, at least one of conditions represented by the following expressions:

$$0.1 < X1/(|f2| \times Z) < 0.2 \quad \text{Expression (4),}$$

$$2.0 < fT/f1 < 5.0 \quad \text{Expression (5),}$$

$$0.07 < fW/f1 < 0.13 \quad \text{Expression (6),}$$

$$0.2 < X1/fT < 0.35 \quad \text{Expression (7), and}$$

$$-7.0 < f1/f2 < -5.0 \quad \text{Expression (8)}$$

should be satisfied.

Next, the technical meaning of each of the above-described condition expressions will be described.

The condition expression (4) determines the variable magnification ratio (zooming ratio) with reference to the maximum change amount of each of the first and second lens groups L1 and L2, and the most appropriate focal length of the second lens group L2.

When the upper limit of the condition expression (4) is exceeded, the length of the lens becomes long in regard to the zooming ratio, or the share of the zooming ratio is tilted toward lens groups other than the first and second lens groups L1 and L2. Consequently, it becomes difficult to obtain a downsized zoom lens having a short length.

When the lower limit of the condition expression (4) is violated, the length of the lens becomes long in regard to the zooming ratio and the sensitivity of the second lens group L2 becomes so strong that it becomes difficult to manufacture the zoom lens, or the share of the zooming ratio is tilted toward the second lens group L2. Consequently, the number of the lenses included in the second lens group L2 is increased, which makes it difficult to obtain a downsized zoom lens having a short length.

It is preferable that the value of the condition expression (4) falls within the range of the following numerical values.

$$0.110 < X1/(|f2| \times Z) < 0.190 \quad \text{Expression (4a)}$$

The condition expression (5) relates to the value of magnification carried by the lens groups closer to the image side than the second lens group L2 is at the telephoto end.

In the case where a zoom lens having the focal length of the same value and the zooming ratio of the same value is used, the refractive power of the first lens group L1 is increased as the above-described values are increased, and the entire lens system is downsized.

When the upper limit of the condition expression (5) is exceeded, the power (refractive power) of the first lens group L1 is increased. Therefore, the number of lenses of the lens structure of the first lens group L1 and those of the lens structures of other lens groups should be increased, so as to keep the optical capabilities in appropriate condition, which makes it difficult to obtain a downsized zoom lens having a high zooming ratio. Further, the zoom lens has a significantly high sensitivity and is manufactured with difficulty.

When the lower limit of the condition expression (5) is violated, the power (refractive power) of the first lens group L1 is decreased, which makes it difficult to obtain a downsized zoom lens having a high zooming ratio.

It is preferable that the value of the condition expression (5) falls within the range of the following numerical values.

$$2.2 < fT/f1 < 4.8 \quad \text{Expression (5a)}$$

The condition expression (6) relates to the value of magnification carried by the lens groups closer to the image side than the second lens group L2 is at the wide angle end.

As the above-described value increases, the power of magnifying the focal length of the first lens group L1 at the telephoto end becomes relatively high. That is to say, the aberration of the first lens group L1 is significantly affected at the telephoto end.

When the upper limit of the condition expression (6) is exceeded, the aberration of the first lens group L1 is significantly affected. Consequently, the number of lenses included in the first lens group L1 is increased, so as to keep the optical capabilities in appropriate condition.

When the lower limit of the condition expression (6) is violated, the power of the first lens group L1 becomes so low that the length of a moving stroke associated with zooming becomes long. Consequently, the length of the zoom lens is increased.

It is preferable that the value of the condition expression (6) falls within the range of the following numerical values.

$$0.08 < fW/f1 < 0.12 \quad \text{Expression (6a)}$$

The condition expression (7) determines the maximum interval between the first and second lens groups in regard to the focal length at the telephoto end of the zoom lens.

Generally, as the zooming ratio grows, so does the length of the moving stroke of the zoom lens groups. According to an embodiment of the present invention, the positive-lead type zoom lens includes the lens groups arranged on the object side, the lens groups having the positive refractive power. In that case, the second lens group L2, which is a lens group having the negative refractive power, carries a large share of zooming ratio.

However, when the second lens group L2 carries the large share of variable magnification ratio, the number of lenses and the sensitivity of the second lens group L2 are increased, which makes it difficult to manufacture the second lens group L2.

The condition expression (7) determines the share of variable magnification ratio carried by the second lens group L2, and indicates a numerical-value range appropriate for a downsized zoom lens having a high zooming ratio and lens groups with refractive powers which are positive, negative, and positive in that order from the object side, as is the case with the above-described embodiments.

When the maximum interval between the first and second lens groups grows beyond the upper limit of the condition expression (7), it becomes difficult to obtain a downsized zoom lens having a high zooming ratio, or the share of zooming ratio and the sensitivity of the second lens group L2 are so increased that the zoom lens is manufactured with difficulty. In another case, the number of lenses included in the second lens group L2 is increased.

If the maximum interval between the first and second lens groups is decreased beyond the lower limit of the condition expression (7), the power of each of the first and second lens groups L1 and L2 becomes so large that the zoom lens is manufactured with difficulty. In another case, the share of variable magnification ratio carried by the second lens group L2 becomes small and that carried by the third lens group L3 becomes relatively large.

Further, the length of the zoom lens is increased, as a result.

It is preferable that the value of the condition expression (7) falls within the range of the following numerical values.

$$0.21 < X1/fT < 0.34 \quad \text{Expression (7a)}$$

The condition expression (8) indicates the ratio between the focal length of the first lens group L1 and that of the second lens group L2. As is clear from Equation (A), the above-described ratio is used to appropriately set one of parameters determining the zooming ratio (variable magnification ratio).

Further, when the aperture stop SP is closer to the image side than the second lens group L2 is, as is the case with the above-described embodiment, the above-described ratio becomes one of parameters determining the size of the effective diameter.

When the focal length of the first lens group L1 goes beyond the upper limit of the condition expression (8) and becomes longer than that of the second lens group L2, the effective diameter is increased.

When the focal length of the first lens group L1 goes beyond the lower limit of the condition expression (8) and becomes shorter than that of the second lens group L2, a moving stroke in which the second lens group L2 can be displaced is decreased so that a high zooming ratio is attained with difficulty.

It is preferable that the value of the condition expression (8) falls within the range of the following numerical values.

$$-6.5 < f1/f2 < -5.1 \qquad \text{Expression (8a)}$$

In each of the embodiments of the present invention, upon zooming from the wide angle end to the telephoto end, the first lens group L1 moves while drawing a locus convex toward the image side. That is to say, the first lens group L1 moves so that the position of the first lens group L1 at the telephoto end is closer to the object side than the position of the first lens group L1 is at the wide angle end.

The reason why the first lens group L1 moves as described above is explained below. In the case where a zoom lens having an imaging angle of view of 70° or more at the wide angle end is used, as is the case with the above-described embodiment, the zoom state where the effective diameter is decided is determined at a position a little off the wide angle end toward the telephoto end. At that time, the first lens group L1 is provided on the image side as described above so that the effective diameter is decreased.

According to each embodiment of the present invention, the second lens group includes a negative lens, another negative lens, and a positive lens that are arranged in that order from the object side toward the image side. At least one of the above-described lenses has an aspheric surface.

By arranging the above-described negative lenses ahead of the positive lenses from the object side as described above, the position of the principal point of the second lens group L2 is moved toward the object side so that the space of the interval between the first and second lens groups at the wide angle end is effectively used. Further, providing the aspheric surface allows for reducing an image plane variation occurring mainly for zooming.

According to each embodiment of the present invention, the first lens group L1 includes a negative lens, a positive lens, and another positive lens that are arranged in that order from the object side toward the image side, and at least one of the above-described lenses has an aspheric surface.

In each embodiment of the present invention, upon zooming from the wide angle end toward the telephoto end, the interval between the aperture stop and the third lens group L3 is gradually decreased as the zooming is attained.

In the case where a zoom lens having an imaging angle of view of 70° or more at the wide angle end is used, as is the case with each embodiment of the present invention, the zoom state in which the effective diameter is determined is usually on the wide-angle-end side. By bringing the aperture stop close to the object side, as is the case with each embodiment of the present invention, the effective diameter is reduced.

Next, the characteristics of the lens structure of each embodiment of the present invention will be described.

According to a first embodiment of the present invention, which is shown in FIG. 1, the first lens group L1 having the positive refractive power, the second lens group L2 having the negative refractive power, the aperture stop SP, the third lens group L3 having the positive refractive power, and the fourth lens group L4 having the positive refractive power are provided in that order from the object side toward the image side.

Upon zooming (variable magnification) from the wide angle end to the telephoto end, the first lens group L1 moves toward the image side, and moves toward the object side in such a way as to make a round trip, while drawing a locus convex toward the image side. The second lens group L2 moves toward the image side, and the third lens group L3 moves toward the object side. The fourth lens group L4 moves toward the object side in such a way as to correct the image-plane position changing in association with the variable magnification, and moves toward the image side in such a way as to make a round trip while drawing a locus convex toward the object side.

Further, upon zooming from the wide angle end to the telephoto end, the aperture stop SP moves from the midpoint between the second and third lens groups L2 and L3 so that the interval between the aperture stop SP and the third lens group L3 is gradually decreased.

The first lens group L1 is provided with a single aspheric surface, each of the second and third lens groups L2 and L3 is provided with two aspheric surfaces, and the fourth lens group L4 is provided with a single aspheric surface. Consequently, the spherical aberration, the field curvature, distortion, and so forth are appropriately corrected.

A glass block G including a crystal optical low-pass filter, an infrared cut filter, and so forth is provided between the fourth lens block L4 and the image plane IP.

According to a second embodiment of the present invention, which is shown in FIG. 3, the arrangement of the refractive powers of the lens groups, conditions under which the lens groups are moved in association with zooming, conditions under which the aperture stop SP is moved in association with zooming, the arrangement of the glass block G, and so forth are the same as those of the first embodiment.

Each of the first, second, and third lens groups L1, L2, and L3 is provided with two aspheric surfaces and the fourth lens group L4 is provided with a single aspheric surface. Consequently, the spherical aberration, the field curvature, the distortion, and so forth are appropriately corrected.

According to a third embodiment of the present invention, which is shown in FIG. 5, the arrangement of the refractive powers of the lens groups, the conditions under which the lens groups are moved in association with zooming, the conditions under which the aperture stop SP is moved in association with zooming, the arrangement of the glass block G, and so forth are the same as those of the first embodiment.

The first lens group L1 is provided with a single aspheric surface, each of the second and third lens groups L2 and L3 is provided with two aspheric surfaces, and the fourth lens group L4 is provided with a single aspheric surface. Consequently, the spherical aberration, the field curvature, the distortion, and so forth are appropriately corrected.

According to a fourth embodiment of the present invention, which is shown in FIG. 7, the first lens group L1 having the positive refractive power, the second lens group L2 having the negative refractive power, the aperture stop SP, the third lens group L3 having the positive refractive power, the fourth lens group L4 having the positive refractive power, and the fifth lens group L5 having the negative refractive power are provided in that order from the object side toward the image side.

Upon zooming from the wide angle end to the telephoto end, the first lens group L1 moves toward the image side, and moves toward the object side in such a way as to make a round trip, while drawing a locus convex toward the image side. The second lens group L2 moves toward the image side, and the third lens group L3 moves toward the object side. The fourth lens group L4 moves toward the object side in such a way as to correct the image-plane position changing in association with the variable magnification, and moves toward the image side in such a way as to make a round trip while drawing a locus convex toward the object side.

The fifth lens group L5 moves toward the object side while drawing a locus convex toward the object side. Further, upon zooming from the wide angle end to the telephoto end, the aperture stop SP moves from the midpoint between the second and third lens groups L2 and L3 so that the interval between the aperture stop SP and the third lens group L3 is gradually decreased.

The first lens group L1 is provided with a single aspheric surface, each of the second and third lens groups L2 and L3 is provided with two aspheric surfaces, and the fourth lens group L4 is provided with a single aspheric surface. Consequently, the spherical aberration, the field curvature, the distortion, and so forth are appropriately corrected.

The glass block G including the crystal optical low-pass filter, the infrared cut filter, and so forth is provided between the fifth lens block L5 and the image plane IP.

According to a fifth embodiment of the present invention, which is shown in FIG. 9, the first lens group L1 having the positive refractive power, the second lens group L2 having the negative refractive power, the aperture stop SP, the third lens group L3 having the positive refractive power, the fourth lens group L4 having the positive refractive power, and the fifth lens group L5 having the positive refractive power are provided in that order from the object side toward the image side.

Upon zooming from the wide angle end to the telephoto end, the first lens group L1 moves toward the image side, and moves toward the object side in such a way as to make a round trip, while drawing a locus convex toward the image side. The second lens group L2 moves toward the image side, and the third lens group L3 moves toward the object side. The fourth lens group L4 moves toward the object side in such a way as to correct the image-plane position changing in association with the variable magnification, and moves toward the image side in such a way as to make a round trip while drawing a locus convex toward the object side.

The fifth lens group L5 moves toward the object side while drawing a locus convex toward the object side. Further, upon zooming from the wide angle end to the telephoto end, the aperture stop SP moves from the midpoint between the second and third lens groups L2 and L3 so that the interval between the aperture stop SP and the third lens group L3 is gradually decreased.

The first lens group L1 is provided with a single aspheric surface, each of the second and third lens groups L2 and L3 is provided with two aspheric surfaces, and the fourth lens group L4 is provided with a single aspheric surface. Consequently, the spherical aberration, the field curvature, the distortion, and so forth are appropriately corrected.

The glass block G including the crystal optical low-pass filter, the infrared cut filter, and so forth is provided between the fifth lens group L5 and the image plane IP.

According to a sixth embodiment of the present invention, which is shown in FIG. 11, the first lens group L1 having the positive refractive power, the second lens group L2 having the negative refractive power, the aperture stop SP, the third lens group L3 having the positive refractive power, the fourth lens group L4 having the negative refractive power, and the fifth lens group L5 having the positive refractive power are provided in that order from the object side toward the image side.

Upon zooming from the wide angle end to the telephoto end, the first lens group L1 moves toward the image side, and moves toward the object side in such a way as to make a round trip, while drawing a locus convex toward the image side. The second lens group L2 moves toward the image side, and the third lens group L3 moves toward the object side. The fourth lens group L4 moves toward the object side in such a way as to correct the image-plane position changing in association with the variable magnification, and moves toward the image side in such a way as to make a round trip while drawing a locus convex toward the object side.

Further, upon zooming from the wide angle end to the telephoto end, the aperture stop SP moves from the midpoint between the second and third lens groups L2 and L3 so that the interval between the aperture stop SP and the third lens group L3 is gradually decreased.

The first lens group L1 is provided with a single aspheric surface, each of the second and third lens groups L2 and L3 is provided with two aspheric surfaces, and the fourth lens group L4 is provided with a single aspheric surface. Consequently, the spherical aberration, the field curvature, the distortion, and so forth are appropriately corrected.

The glass block G including the crystal optical low-pass filter, the infrared cut filter, and so forth is provided between the fifth lens block L5 and the image plane IP.

Next, numerical embodiments 1, 2, 3, 4, 5, and 6 corresponding to the first to sixth embodiments will be shown. In each of the numerical embodiments, the sign i indicates the order of optical surfaces provided from the object side. The sign ri indicates the curvature radius of the surface of the i-th lens, the sign di indicates the thickness of the i-th lens and air space, the sign ndi indicates the refractive index relative to a line d of the material of the i-th lens, and the sign vdi indicates an Abbe number relative to the line d of the material of the i-th lens. The relationships between the above-described condition expressions and the numerical embodiments are shown in Table-1.

When an X axis is defined in the optical-axis direction, an H axis is defined in a direction orthogonal to the optical axis, the direction in which light travels is determined to be positive, the sign R represents the paraxial radius of curvature, the sign K represents a conical constant, and each of the signs A4, A6, A8, and A10 is determined to be an aspheric coefficient, an equation is written by using the following form:

$$X = \frac{(1/R)H^2}{1+\sqrt{1-(1+K)(H/R)^2}} + A4 \times H^4 + A6 \times H^6 + A8 \times H^8 + A10 \times H^{10}.$$

The above-described equation represents the aspheric shape.

As to the value of the aspheric coefficient, the "E–Z" designation means "$10^{-Z}$," for example. In the numerical embodiment, the last two surfaces denote the surfaces of the optical block including a filter, a faceplate, and so forth.

The sign BF indicates a back focus obtained by performing air conversion for the distance from the last surface of the lens to a paraxial image plane.

In the section of BF, "in air" denotes the distance from the last lens surface to the image plane, the distance being calculated through the air conversion. If the thickness of a parallel plate is indicated by the sign d and the refractive index is indicated by the sign n, the air-conversion value of the parallel plate is determined to be d/n. The length of the lens is obtained by adding the back focus BF to the distance from the forefront surface of the lens to the last surface of the lens. The aspheric surface is indicated by adding an asterisk after the surface number.

Further, when the amount of movement accomplished by the x-th lens group (x: 1 to 5, aperture stop group) upon zooming from the wide angle end to the telephoto end is represented by the sign M, $$M = a1 \cdot x + a2 \cdot x^2 + a3 \cdot x^3 + a4 \cdot x^4 + a5 \cdot x^5 + a6 \cdot x^6 + a7 \cdot x^7 + a8 \cdot x^8 + a9 \cdot x^9 + a10 \cdot x^{10}$$

is represented, for example.

However, $0 \leq x \leq 1$ holds, where x=0 denotes the wide angle end and x=1 denotes the telephoto end. The image-plane side is determined to be positive.

Numerical Embodiment 1
f = 4.92~127.52 Fno = 2.8~5.6 2ω = 75.8°~3.4°

| SURFACE NUMBER | r | d | nd | vd | EFFECTIVE DIAMETER |
|---|---|---|---|---|---|
| 1 | 57.354 | 1.70 | 1.84666 | 23.9 | 38.31 |
| 2 | 36.789 | 5.79 | 1.43875 | 95.0 | 35.01 |
| 3 | −365.826 | 0.10 | | | 33.86 |
| 4* | 29.485 | 4.81 | 1.61800 | 63.3 | 32.65 |
| 5 | 231.881 | (VARIABLE) | | | 32.32 |
| 6* | −111.480 | 1.00 | 2.00330 | 28.3 | 15.43 |
| 7* | 9.244 | 3.64 | | | 11.56 |
| 8 | −17.150 | 0.90 | 1.62041 | 60.3 | 11.21 |
| 9 | 13.623 | 0.00 | | | 10.95 |
| 10 | 13.623 | 1.92 | 1.92286 | 18.9 | 10.95 |
| 11 | −132.561 | (VARIABLE) | | | 10.81 |
| 12 (APERTURE) | ∞ | (VARIABLE) | | | 6.21 |
| 13* | 7.374 | 3.49 | 1.80100 | 35.0 | 8.92 |
| 14 | 405.249 | 0.70 | | | 8.27 |
| 15* | 40.401 | 0.60 | 2.00330 | 28.3 | 7.78 |
| 16 | 4.573 | 2.83 | 1.49700 | 81.5 | 6.97 |
| 17 | ∞ | (VARIABLE) | | | 7.25 |
| 18* | 23.251 | 1.87 | 1.83481 | 42.7 | 9.56 |
| 19 | −16.973 | 0.50 | 1.84666 | 23.9 | 9.55 |
| 20 | −65.640 | (VARIABLE) | | | 9.53 |
| 21 | ∞ | 0.75 | 1.51633 | 64.1 | 9.16 |
| 22 | ∞ | (VARIABLE) | | | 9.00 |

ASPHERIC SURFACE DATA

FOURTH SURFACE

K = 2.06781e−001  A4 = −1.88626e−006  A6 = −3.06976e−009
A8 = 4.86779e−013  A10 = −8.96638e−015

SIXTH SURFACE

K = 1.69656e+002  A4 = −8.87159e−005  A6 = 7.53209e−006
A8 = −1.17061e−007  A10 = 6.79500e−010

SEVENTH SURFACE

K = 8.43206e−001  A4 = −3.10567e−004  A6 = 3.13866e−006
A8 = 2.25259e−007  A10 = −6.66218e−009

THIRTEENTH SURFACE

K = −1.09108e+000  A4 = 2.16722e−004  A6 = 2.10787e−006
A8 = −3.49500e−008  A10 = −1.79005e−009

FIFTEENTH SURFACE

K = −1.76434e+002  A4 = 2.98374e−004  A6 = −1.23138e−005  A8 = 5.76075e−007
A10 = −1.05209e−009

EIGHTEENTH SURFACE

K = 3.36325e+000  A4 = −1.60088e−005  A6 = −9.53894e−007  A8 = 3.38021e−008
A10 = −3.27966e−010

VARIOUS DATA

| ZOOMING RATIO | | 25.91 | |
|---|---|---|---|
| | WIDE ANGLE END | MIDDLE POSITION | TELEPHOTO END |
| FOCAL LENGTH | 4.92 | 12.34 | 127.52 |
| F NUMBER | 2.54 | 3.52 | 5.64 |
| ANGLE OF VIEW | 37.89 | 17.25 | 1.72 |
| IMAGE HEIGHT | 3.83 | 3.83 | 3.83 |
| TOTAL LENGTH OF LENS | 80.20 | 83.25 | 90.70 |
| BF | 9.86 | 12.93 | 4.13  in air |
| d5 | 0.85 | 11.48 | 28.25 |
| d11 | 22.29 | 15.80 | 0.65 |
| d12 | 10.82 | 2.91 | 1.16 |
| d17 | 6.26 | 10.04 | 26.39 |
| d20 | 5.82 | 8.89 | 0.09 |
| d22 | 3.55 | 3.55 | 3.55 |
| ENTRANCE PUPIL | 20.33 | 49.35 | 236.55 |
| EXIT PUPIL | 284.51 | −90.00 | 60.99 |
| FRONT PRINCIPAL-POINT POSITION | 25.33 | 60.06 | 647.14 |

-continued

Numerical Embodiment 1
f = 4.92~127.52 Fno = 2.8~5.6 2ω = 75.8°~3.4°

| | | | |
|---|---|---|---|
| REAR PRINCIPAL-POINT POSITION | −1.38 | −8.79 | −123.97 |

ZOOM-LENS GROUP DATA

| GROUP | FIRST SURFACE | FOCAL LENGTH | LENS STRUCTURAL LENGTH | FRONT PRINCIPAL-POINT POSITION | REAR PRINCIPAL-POINT POSITION |
|---|---|---|---|---|---|
| 1 | 5 | 43.58 | 12.40 | 3.56 | −4.57 |
| 2 | 11 | −8.04 | 7.46 | 0.46 | −5.34 |
| 3 | 12 | ∞ | 0.00 | 0.00 | 0.00 |
| 4 | 17 | 20.07 | 7.62 | −5.25 | −8.37 |
| 5 | 20 | 21.04 | 2.37 | 0.33 | −0.97 |
| 6 | 22 | ∞ | 0.75 | 0.25 | −0.25 |

MOVING COEFFICIENT

| | | | | |
|---|---|---|---|---|
| FIRST GROUP: | $a1 = 5.62849e+01$ | $a2 = -2.8118727e+02$ | $a3 = 3.7807626e+02$ | $a4 = 8.537479e+01$ |
| | $a5 = -8.0703646e+02$ | $a6 = 8.7247665e+02$ | $a7 = -3.1447399e+02$ | |
| SECOND GROUP: | $a1 = 4.88489e+02$ | $a2 = -2.0925259e+02$ | $a3 = 4.2964918e+02$ | $a4 = -2.602403e+02$ |
| | $a5 = 1.1794277e+02$ | $a6 = 1.5624545e+02$ | $a7 = -3.040564e+01$ | |
| APERTURE GROUP: | $a1 = 1.297543e+01$ | $a2 = -2.693439e+01$ | $a3 = 9.21743e+01$ | |
| THIRD GROUP: | $a1 = 1.440613e+01$ | | | |

Numerical Embodiment 2
f = 4.47~128.98 Fno = 2.8~5.6 2ω = 81.2°~3.4°

SURFACE DATA

| SURFACE NUMBER | r | d | nd | vd | EFFECTIVE DIAMETER |
|---|---|---|---|---|---|
| 1* | 52.332 | 1.70 | 1.84666 | 23.9 | 38.68 |
| 2 | 35.313 | 0.30 | | | 36.24 |
| 3 | 35.689 | 5.66 | 1.43875 | 95.0 | 36.32 |
| 4 | 740.998 | 0.10 | | | 36.17 |
| 5* | 31.803 | 4.99 | 1.61800 | 63.3 | 35.11 |
| 6 | 191.478 | (VARIABLE) | | | 34.74 |
| 7* | −72.080 | 1.00 | 2.00330 | 28.3 | 15.44 |
| 8* | 9.925 | 3.51 | | | 11.29 |
| 9 | −17.186 | 0.90 | 1.62041 | 60.3 | 10.81 |
| 10 | 13.285 | 1.66 | 1.92286 | 18.9 | 10.27 |
| 11 | −195.321 | (VARIABLE) | | | 10.10 |
| 12(APERTURE) | ∞ | (VARIABLE) | | | 5.85 |
| 13* | 7.381 | 3.52 | 1.80100 | 35.0 | 9.78 |
| 14 | 868.366 | 0.70 | | | 9.20 |
| 15* | 33.106 | 0.60 | 2.00330 | 28.3 | 8.63 |
| 16 | 4.669 | 3.03 | 1.49700 | 81.5 | 7.59 |
| 17 | ∞ | (VARIABLE) | | | 7.89 |
| 18* | 21.826 | 2.40 | 1.83481 | 42.7 | 10.05 |
| 19 | −10.216 | 0.50 | 1.84666 | 23.9 | 10.06 |
| 20 | −34.417 | (VARIABLE) | | | 10.14 |
| 21 | ∞ | 0.75 | 1.51633 | 64.1 | 8.87 |
| 22 | ∞ | (VARIABLE) | | | 8.66 |

ASPHERIC SURFACE DATA

FIRST SURFACE $K = -1.57262e-002$    $A4 = 6.81543e-007$    $A6 = -9.36881e-010$
$A8 = -1.39653e-013$    $A10 = 4.90456e-016$

FIFTH SURFACE $K = -5.95662e-001$    $A4 = 7.38431e-007$    $A6 = 2.08348e-009$
$A8 = 1.39412e-012$    $A10 = 9.59382e-016$

SEVENTH SURFACE $K = 7.17114e+001$    $A4 = 5.80513e-005$    $A6 = 6.28084e-006$
$A8 = -1.19491e-007$    $A10 = 8.08601e-010$

-continued

Numerical Embodiment 2
f = 4.47~128.98 Fno = 2.8~5.6 2ω = 81.2°~3.4°

EIGHTH SURFACE

| K = 1.29222e+000 | A4 = −1.83147e−004 | A6 = 3.55306e−006 |
| A8 = 2.39677e−007 | A10 = −7.25182e−009 | |

THIRTEENTH SURFACE

| K = −8.27241e−001 | A4 = 1.28383e−004 | A6 = 1.21406e−006 |
| A8 = 3.87356e−008 | A10 = −3.42505e−009 | |

FIFTEENTH SURFACE

| K = −1.33024e+002 | A4 = 3.48819e−004 | A6 = −1.90377e−005 |
| A8 = 7.46050e−007 | A10 = −2.41929e−009 | |

EIGHTEENTH SURFACE

| K = 4.36999e+000 | A4 = −4.16141e−005 | A6 = −1.50184e−006 |
| A8 = 4.60880e−008 | A10 = −5.89428e−010 | |

VARIOUS DATA

ZOOMING RATIO  30.27

|  | WIDE ANGLE END | MIDDLE POSITION | TELEPHOTO END | |
|---|---|---|---|---|
| FOCAL LENGTH | 4.41 | 11.20 | 133.55 | |
| F NUMBER | 2.08 | 3.02 | 5.76 | |
| ANGLE OF VIEW | 40.96 | 18.88 | 1.64 | |
| IMAGE HEIGHT | 3.83 | 3.83 | 3.83 | |
| TOTAL LENGTH OF LENS | 70.66 | 75.01 | 93.59 | |
| BF | 8.34 | 11.49 | 2.30 | in air |
| d6 | 0.64 | 11.65 | 33.48 | |
| d11 | 16.10 | 10.00 | 0.32 | |
| d12 | 10.84 | 2.76 | 0.89 | |
| d17 | 3.91 | 8.27 | 25.76 | |
| d20 | 6.70 | 9.85 | 0.66 | |
| d22 | 1.15 | 1.15 | 1.15 | |
| ENTRANCE PUPIL | 19.23 | 44.26 | 280.61 | |
| EXIT PUPIL | 52.53 | −214.25 | 33.06 | |
| FRONT PRINCIPAL-POINT POSITION | 24.02 | 54.88 | 973.19 | |
| REAR PRINCIPAL-POINT POSITION | −3.26 | −10.05 | −132.40 | |

ZOOM-LENS GROUP DATA

| GROUP | FIRST SURFACE | FOCAL LENGTH | LENS STRUCTURAL LENGTH | FRONT PRINCIPAL-POINT POSITION | REAR PRINCIPAL-POINT POSITION |
|---|---|---|---|---|---|
| 1 | 6 | 49.89 | 12.75 | 3.32 | −5.10 |
| 2 | 11 | −8.01 | 7.07 | 0.51 | −4.97 |
| 3 | 12 | ∞ | 0.00 | 0.00 | 0.00 |
| 4 | 17 | 17.75 | 7.85 | −4.25 | −7.81 |
| 5 | 20 | 16.59 | 2.90 | 0.62 | −1.00 |
| 6 | 22 | ∞ | 0.75 | 0.25 | −0.25 |

MOVING COEFFICIENT

| FIRST GROUP: | a1 = 5.533171e+01 | a2 = −283.60652 | a3 = 377.7226 | a4 = 82.66618 |
| | a5 = −811.2846 | a6 = 870.53969 | a7 = −314.29804 | |
| SECOND GROUP: | a1 = 47.59204 | a2 = −207.38794 | a3 = 426.03454 | a4 = −271.20819 |
| | a5 = −109.24664 | a6 = 158.87519 | a7 = −34.74995 | |
| APERTURE GROUP: | a1 = 13.22425 | a2 = −31.00847 | a3 = 11.90843 | |
| THIRD GROUP: | a1 = −15.8232 | | | |

Numerical Embodiment 3
f = 4.34~128.99 Fno = 2.8~5.6 2ω = 82.9°~3.4°

SURFACE DATA

| SURFACE NUMBER | r | d | nd | vd | EFFECTIVE DIAMETER |
|---|---|---|---|---|---|
| 1 | 56.765 | 1.70 | 1.84666 | 23.9 | 38.83 |
| 2 | 36.943 | 5.72 | 1.43875 | 95.0 | 35.49 |
| 3 | −422.109 | 0.10 | | | 35.38 |
| 4* | 30.320 | 5.16 | 1.61800 | 63.3 | 34.07 |
| 5 | 217.098 | (VARIABLE) | | | 33.64 |
| 6* | −66.412 | 1.00 | 2.00330 | 28.3 | 16.06 |
| 7* | 8.486 | 3.77 | | | 11.89 |
| 8 | −21.436 | 0.90 | 1.62041 | 60.3 | 11.60 |
| 9 | 14.912 | 2.04 | 1.92286 | 18.9 | 11.33 |
| 10 | −64.874 | (VARIABLE) | | | 11.19 |
| 11(APERTURE) | ∞ | (VARIABLE) | | | 6.17 |
| 12* | 7.507 | 3.68 | 1.80100 | 35.0 | 11.78 |
| 13 | 234.148 | 0.70 | | | 11.14 |
| 14* | 90.643 | 0.60 | 2.00330 | 28.3 | 10.28 |
| 15 | 5.015 | 3.60 | 1.49700 | 81.5 | 8.62 |
| 16 | ∞ | (VARIABLE) | | | 8.95 |
| 17* | 25.113 | 4.16 | 1.81600 | 46.6 | 13.69 |
| 18 | −11.264 | 0.50 | 1.84666 | 23.9 | 13.76 |
| 19 | −22.082 | (VARIABLE) | | | 13.93 |
| 20 | ∞ | 0.75 | 1.51633 | 64.1 | 9.81 |
| 21 | ∞ | (VARIABLE) | | | 9.55 |

ASPHERIC SURFACE DATA

FOURTH SURFACE

K = −6.90232e−001    A4 = 2.08798e−006    A6 = 1.52470e−009
A8 = −1.66372e−012   A10 = 4.95226e−015

SIXTH SURFACE

K = 5.35670e+001     A4 = 3.77703e−005    A6 = 4.79667e−006
A8 = −8.42688e−008   A10 = 5.07479e−010

SEVENTH SURFACE

K = 3.96248e−001     A4 = −2.52616e−004   A6 = 1.86061e−006
A8 = 2.44011e−007    A10 = −6.90715e−009

TWELFTH SURFACE

K = −1.21201e+000    A4 = 3.04721e−004    A6 = 2.56533e−006
A8 = 1.20723e−008    A10 = 2.37557e−011

FOURTEENTH SURFACE

K = −1.34917e+003    A4 = 4.18104e−005    A6 = −1.16105e−005
A8 = 4.11624e−007    A10 = −4.08921e−009

SEVENTEENTH SURFACE

K = 1.58077e−001     A4 = −5.01736e−005   A6 = 1.26146e−007
A8 = −1.59819e−009   A10 = 1.42237e−011

VARIOUS DATA

| ZOOMING RATIO | | 29.74 | | |
|---|---|---|---|---|
| | WIDE ANGLE END | MIDDLE POSITION | TELEPHOTO END | |
| FOCAL LENGTH | 4.34 | 8.59 | 128.99 | |
| F NUMBER | 2.09 | 2.61 | 5.55 | |
| ANGLE OF VIEW | 41.45 | 24.02 | 1.70 | |
| IMAGE HEIGHT | 3.83 | 3.83 | 3.83 | |
| TOTAL LENGTH OF LENS | 79.63 | 82.50 | 97.08 | |
| BF | 9.40 | 11.55 | 4.49 | in air |
| d5 | 0.80 | 7.67 | 29.70 | |
| d10 | 18.92 | 11.47 | 0.22 | |
| d11 | 12.99 | 7.17 | 0.73 | |
| d16 | 3.63 | 10.75 | 28.04 | |
| d19 | 5.43 | 7.58 | 0.52 | |
| d21 | 3.48 | 3.48 | 3.48 | |
| ENTRANCE PUPIL | 19.62 | 34.03 | 261.21 | |
| EXIT PUPIL | 35.56 | 38.12 | 25.25 | |

-continued

Numerical Embodiment 3
f = 4.34~128.99 Fno = 2.8~5.6 2ω = 82.9°~3.4°

| | | | |
|---|---|---|---|
| FRONT PRINCIPAL-POINT POSITION | 24.54 | 44.75 | 1154.56 |
| REAR PRINCIPAL-POINT POSITION | −0.85 | −5.11 | −125.50 |

ZOOM-LENS GROUP DATA

| GROUP | FIRST SURFACE | FOCAL LENGTH | LENS STRUCTURAL LENGTH | FRONT PRINCIPAL-POINT POSITION | REAR PRINCIPAL-POINT POSITION |
|---|---|---|---|---|---|
| 1 | 5 | 44.91 | 12.68 | 3.37 | −4.91 |
| 2 | 10 | −8.32 | 7.72 | −0.04 | −6.38 |
| 3 | 11 | ∞ | 0.00 | 0.00 | 0.00 |
| 4 | 16 | 22.91 | 8.58 | −6.49 | −9.83 |
| 5 | 19 | 15.35 | 4.66 | 1.41 | −1.27 |
| 6 | 21 | ∞ | 0.75 | 0.25 | −0.25 |

MOVING COEFFICIENT

| | | | |
|---|---|---|---|
| FIRST GROUP: | a1 = 4.25794 | a2 = −21.65279 | a3 = −0.05565 |
| | a5 = −1.26975e+02 | | |
| SECOND GROUP: | a1 = 7.41311 | a2 = 0.4321 | a3 = 3.60441 |
| APERTURE GROUP: | a1 = −7.25452 | | |
| THIRD GROUP: | a1 = −19.51774 | | |

Numerical Embodiment 4
f = 4.97~126 Fno = 2.8~5.6 2ω = 75.27°~3.48°

SURFACE DATA

| SURFACE NUMBER | r | d | nd | vd | EFFECTIVE DIAMETER |
|---|---|---|---|---|---|
| 1 | 57.784 | 1.70 | 1.84666 | 23.9 | 38.60 |
| 2 | 37.001 | 5.84 | 1.43875 | 95.0 | 35.27 |
| 3 | −388.123 | 0.10 | | | 34.20 |
| 4* | 29.876 | 4.92 | 1.61800 | 63.3 | 33.00 |
| 5 | 233.561 | (VARIABLE) | | | 32.63 |
| 6* | −98.433 | 1.00 | 2.00330 | 28.3 | 15.24 |
| 7* | 9.310 | 3.59 | | | 11.48 |
| 8 | −17.835 | 0.90 | 1.62041 | 60.3 | 11.08 |
| 9 | 13.531 | 0.00 | | | 10.78 |
| 10 | 13.531 | 1.91 | 1.92286 | 18.9 | 10.78 |
| 11 | −134.564 | (VARIABLE) | | | 10.63 |
| 12(APERTURE) | ∞ | 0.45 | | | 6.05 |
| 13 | ∞ | (VARIABLE) | | | 6.11 |
| 14* | 7.377 | 3.50 | 1.80100 | 35.0 | 8.97 |
| 15 | 413.990 | 0.70 | | | 8.34 |
| 16* | 41.627 | 0.60 | 2.00330 | 28.3 | 7.86 |
| 17 | 4.613 | 2.90 | 1.49700 | 81.5 | 7.06 |
| 18 | ∞ | (VARIABLE) | | | 7.36 |
| 19 | ∞ | 0.00 | | | 9.07 |
| 20* | 22.498 | 1.98 | 1.83481 | 42.7 | 9.19 |
| 21 | −13.537 | 0.50 | 1.84666 | 23.9 | 9.19 |
| 22 | −51.406 | (VARIABLE) | | | 9.19 |
| 23 | −26.164 | 0.36 | 1.62230 | 53.2 | 8.67 |
| 24 | 41.529 | 1.00 | 1.84666 | 23.8 | 8.59 |
| 25 | −73.346 | (VARIABLE) | | | 8.53 |
| 26 | ∞ | 0.75 | 1.51633 | 64.1 | 8.41 |
| 27 | ∞ | (VARIABLE) | | | 8.27 |

ASPHERIC SURFACE DATA

FOURTH SURFACE

K = 7.52034e−002      A4 = −1.16875e−006      A6 = −2.05357e−009
A8 = 9.48576e−013     A10 = −4.90152e−015

SIXTH SURFACE

K = 1.32531e+002      A4 = −8.38834e−005      A6 = 7.62158e−006
A8 = −1.18917e−007    A10 = 6.93660e−010

-continued

Numerical Embodiment 4
f = 4.97~126 Fno = 2.8~5.6 2ω= 75.27°~3.48°

SEVENTH SURFACE

| K = 8.23986e−001 | A4 = −3.05144e−004 | A6 = 3.29599e−006 |
|---|---|---|
| A8 = 2.27809e−007 | A10 = −6.48283e−009 | |

FOURTEENTH SURFACE

| K = −1.18873e+000 | A4 = 2.41591e−004 | A6 = 1.85870e−006 |
|---|---|---|
| A8 = −3.24702e−008 | A10 = −1.94938e−009 | |

SIXTEENTH SURFACE

| K = −1.96842e+002 | A4 = 3.03909e−004 | A6 = −1.26447e−005 |
|---|---|---|
| A8 = 6.04723e−007 | A10 = −1.56082e−009 | |

TWENTIETH SURFACE

| K = 1.52007e+000 | A4 = −1.35608e−006 | A6 = −6.49901e−007 |
|---|---|---|
| A8 = 2.67182e−008 | A10 = −1.23379e−010 | |

VARIOUS DATA

ZOOMING RATIO 25.36

| | WIDE ANGLE END | MIDDLE POSITION | TELEPHOTO END | |
|---|---|---|---|---|
| FOCAL LENGTH | 4.97 | 12.78 | 126.00 | |
| F NUMBER | 2.51 | 3.51 | 5.60 | |
| ANGLE OF VIEW | 37.63 | 16.68 | 1.74 | |
| IMAGE HEIGHT | 3.83 | 3.83 | 3.83 | |
| TOTAL LENGTH OF LENS | 77.70 | 80.60 | 90.09 | |
| BF | 3.13 | 4.41 | 2.45 | in air |
| d5 | 0.92 | 11.67 | 28.86 | |
| d11 | 20.68 | 13.71 | 0.47 | |
| d13 | 10.02 | 2.41 | 0.50 | |
| d18 | 4.51 | 8.04 | 24.60 | |
| d22 | 6.22 | 8.15 | 1.00 | |
| d25 | 1.00 | 2.28 | 0.32 | |
| d27 | 1.64 | 1.64 | 1.64 | |
| ENTRANCE PUPIL | 20.40 | 49.08 | 241.32 | |
| EXIT PUPIL | −279.49 | −53.00 | 80.42 | |
| FRONT PRINCIPAL-POINT POSITION | 25.28 | 58.87 | 568.82 | |
| REAR PRINCIPAL-POINT POSITION | −3.33 | −11.14 | −124.36 | |

ZOOM-LENS GROUP DATA

| GROUP | FIRST SURFACE | FOCAL LENGTH | LENS STRUCTURAL LENGTH | FRONT PRINCIPAL-POINT POSITION | REAR PRINCIPAL-POINT POSITION |
|---|---|---|---|---|---|
| 1 | 5 | 44.28 | 12.56 | 3.57 | −4.65 |
| 2 | 11 | −8.14 | 7.41 | 0.41 | −5.36 |
| 3 | 13 | ∞ | 0.45 | 0.23 | −0.23 |
| 4 | 18 | 20.00 | 7.70 | −5.23 | −8.40 |
| 5 | 22 | 19.26 | 2.48 | 0.41 | −0.96 |
| 6 | 25 | −150.74 | 1.36 | −1.51 | −2.30 |
| 7 | 27 | ∞ | 0.75 | 0.25 | −0.25 |

MOVING COEFFICIENT

| FIRST GROUP: | a1 = 56.02045 | a2 = −279.8192 | a3 = 378.02135 | a4 = 85.41706 |
|---|---|---|---|---|
| | a5 = −806.87362 | a6 = −314.41091 | | |
| SECOND GROUP: | a1 = 48.72197 | a2 = −207.60331 | a3 = 429.81843 | a4 = −260.19698 |
| | a5 = −119.62262 | a6 = 154.95639 | a7 = −30.52476 | |
| APERTURE GROUP: | a1 = 12.4521 | a2 = −27.08363 | a3 = 9.96833 | |
| THIRD GROUP: | a1 = −14.18547 | | | |
| FIFTH GROUP: | a1 = −7.16688 | a2 = 10.84144 | a3 = −2.99156 | |

Numerical Embodiment 5
f = 4.93~128 Fno = 2.8~5.6 2ω = 75.74°~3.43°

SURFACE DATA

| SURFACE NUMBER | r | d | nd | vd | EFFECTIVE DIAMETER |
|---|---|---|---|---|---|
| 1 | 57.175 | 1.70 | 1.84666 | 23.9 | 38.48 |
| 2 | 36.572 | 5.75 | 1.43875 | 95.0 | 35.13 |
| 3 | −478.949 | 0.10 | | | 34.21 |
| 4* | 30.000 | 4.98 | 1.61800 | 63.3 | 33.06 |
| 5 | 252.025 | (VARIABLE) | | | 32.68 |
| 6* | −90.229 | 1.00 | 2.00330 | 28.3 | 15.27 |
| 7* | 9.357 | 3.48 | | | 11.58 |
| 8 | −19.074 | 0.90 | 1.62041 | 60.3 | 11.25 |
| 9 | 13.515 | 0.00 | | | 10.94 |
| 10 | 13.515 | 1.94 | 1.92286 | 18.9 | 10.94 |
| 11 | −131.736 | 0.00 | | | 10.79 |
| 12 | ∞ | (VARIABLE) | | | 10.73 |
| 13(APERTURE) | ∞ | (VARIABLE) | | | 6.10 |
| 14* | 7.241 | 3.57 | 1.80100 | 35.0 | 9.15 |
| 15 | 209.387 | 0.70 | | | 8.42 |
| 16* | 48.547 | 0.60 | 2.00330 | 28.3 | 7.91 |
| 17 | 4.621 | 2.96 | 1.49700 | 81.5 | 7.10 |
| 18 | ∞ | (VARIABLE) | | | 7.45 |
| 19* | 22.015 | 3.12 | 1.83481 | 42.7 | 11.02 |
| 20 | −13.113 | 0.50 | 1.84666 | 23.9 | 11.00 |
| 21 | −50.136 | (VARIABLE) | | | 10.99 |
| 22 | 128.008 | 1.00 | 1.84666 | 23.9 | 8.79 |
| 23 | −39.986 | 0.50 | 1.83481 | 42.7 | 8.69 |
| 24 | −761.335 | (VARIABLE) | | | 8.60 |
| 25 | ∞ | 0.75 | 1.51633 | 64.1 | 8.14 |
| 26 | ∞ | (VARIABLE) | | | 8.03 |

ASPHERIC SURFACE DATA

FOURTH SURFACE

K = −2.86945e−001   A4 = 4.16214e−007   A6 = 2.67932e−010
A8 = −7.20494e−013   A10 = 2.60443e−015

SIXTH SURFACE

K = 1.09096e+002   A4 = −9.84834e−005   A6 = 8.25521e−006
A8 = −1.31249e−007   A10 = 7.68951e−010

SEVENTH SURFACE

K = 8.55721e−001   A4 = −3.42147e−004   A6 = 4.47430e−006
A8 = 2.18010e−007   A10 = −7.31836e−009

FOURTEENTH SURFACE

K = −1.18516e+000   A4 = 2.92303e−004   A6 = 2.55547e−006
A8 = 8.04274e−009   A10 = −1.67373e−009

SIXTEENTH SURFACE

K = −3.09369e+002   A4 = 2.17223e−004   A6 = −1.50751e−005
A8 = 5.72254e−007   A10 = −1.43491e−009

NINETEENTH SURFACE

K = 1.14824e+000   A4 = 4.01887e−006   A6 = −9.38420e−007
A8 = 3.92096e−008   A10 = −4.61768e−010

VARIOUS DATA

ZOOMING RATIO      25.98

| | WIDE ANGLE END | MIDDLE POSITION | TELEPHOTO END | |
|---|---|---|---|---|
| FOCAL LENGTH | 4.93 | 11.57 | 127.97 | |
| F NUMBER | 2.41 | 2.85 | 5.66 | |
| ANGLE OF VIEW | 37.87 | 18.32 | 1.71 | |
| IMAGE HEIGHT | 3.83 | 3.83 | 3.83 | |
| TOTAL LENGTH OF LENS | 78.75 | 82.18 | 90.53 | |
| BF | 2.63 | 2.73 | 0.81 | in air |
| d5 | 0.95 | 11.36 | 28.96 | |
| d12 | 20.72 | 11.00 | 0.71 | |
| d13 | 10.36 | 6.94 | 1.14 | |
| d18 | 5.02 | 8.51 | 25.28 | |
| d21 | 6.00 | 8.57 | 0.54 | |

-continued

Numerical Embodiment 5
f = 4.93~128 Fno = 2.8~5.6 2ω = 75.74°~3.43°

| | | | |
|---|---|---|---|
| d24 | 2.00 | 2.10 | 0.18 |
| d26 | 0.14 | 0.14 | 0.14 |
| ENTRANCE PUPIL | 20.51 | 46.70 | 243.48 |
| EXIT PUPIL | 80.70 | 112.56 | 32.81 |
| FRONT PRINCIPAL-POINT POSITION | 25.73 | 59.46 | 872.78 |
| REAR PRINCIPAL-POINT POSITION | −4.78 | −11.42 | −127.82 |

ZOOM-LENS GROUP DATA

| GROUP | FIRST SURFACE | FOCAL LENGTH | LENS STRUCTURAL LENGTH | FRONT PRINCIPAL-POINT POSITION | REAR PRINCIPAL-POINT POSITION |
|---|---|---|---|---|---|
| 1 | 5 | 44.45 | 12.54 | 3.52 | −4.68 |
| 2 | 12 | −8.35 | 7.32 | 0.33 | −5.38 |
| 3 | 13 | ∞ | 0.00 | 0.00 | 0.00 |
| 4 | 18 | 20.43 | 7.83 | −5.68 | −8.74 |
| 5 | 21 | 18.97 | 3.62 | 0.60 | −1.41 |
| 6 | 24 | 125.00 | 1.50 | 0.13 | −0.68 |
| 7 | 26 | ∞ | 0.75 | 0.25 | −0.25 |

MOVING COEFFICIENT

| | | | | |
|---|---|---|---|---|
| FIRST GROUP: | a1 = 55.91685 | a2 = −281.65956 | a3 = 377.0706 | a4 = 85.42354 |
| | a5 = −807.02532 | a6 = 872.66939 | a7 = −314.17599 | |
| SECOND GROUP: | a1 = 46.70509 | a2 = −207.38897 | a3 = 429.63739 | a4 = −260.16086 |
| | a5 = −117.30415 | a6 = 155.35564 | a7 = −30.60762 | |
| APERTURE GROUP: | a1 = 10.15564 | a2 = −51.26070 | a3 = 37.34052 | |
| THIRD GROUP: | a1 = −12.98495 | | | |
| FIFTH GROUP: | a1 = −2 | a2 = 3.68753 | a3 = 0.12936 | |

Numerical Embodiment 6
f = 4.92~126.95 Fno = 2.8~5.6 2ω = 75.8°~3.45°

SURFACE DATA

| SURFACE NUMBER | r | d | nd | vd | EFFECTIVE DIAMETER |
|---|---|---|---|---|---|
| 1 | 58.187 | 1.70 | 1.84666 | 23.9 | 38.59 |
| 2 | 36.821 | 5.65 | 1.43875 | 95.0 | 35.21 |
| 3 | −712.478 | 0.10 | | | 34.49 |
| 4* | 29.655 | 5.14 | 1.61800 | 63.3 | 33.41 |
| 5 | 269.732 | (VARIABLE) | | | 33.05 |
| 6* | −85.922 | 1.00 | 2.00330 | 28.3 | 15.41 |
| 7* | 9.077 | 3.50 | | | 11.66 |
| 8 | −20.738 | 0.90 | 1.62041 | 60.3 | 11.37 |
| 9 | 13.702 | 1.97 | 1.92286 | 18.9 | 11.09 |
| 10 | −127.930 | (VARIABLE) | | | 10.95 |
| 11(APERTURE) | ∞ | (VARIABLE) | | | 6.04 |
| 12* | 7.222 | 3.43 | 1.80100 | 35.0 | 8.80 |
| 13 | −617.888 | 0.70 | | | 8.16 |
| 14* | 41.286 | 0.60 | 2.00330 | 28.3 | 7.62 |
| 15 | 4.543 | 2.76 | 1.49700 | 81.5 | 6.84 |
| 16 | ∞ | (VARIABLE) | | | 7.09 |
| 17 | −84.499 | 0.50 | 1.60738 | 56.8 | 8.07 |
| 18 | 37.497 | 1.00 | 1.84666 | 23.8 | 8.28 |
| 19 | 48.818 | (VARIABLE) | | | 8.46 |
| 20* | 17.738 | 3.05 | 1.83481 | 42.7 | 10.89 |
| 21 | −10.514 | 0.50 | 1.84666 | 23.9 | 10.88 |
| 22 | −42.554 | (VARIABLE) | | | 10.88 |
| 23 | ∞ | 0.75 | 1.51633 | 64.1 | 9.33 |
| 24 | ∞ | (VARIABLE) | | | 9.11 |

ASPHERIC SURFACE DATA

FOURTH SURFACE

K = −2.41603e−002     A4 = −8.76099e−007     A6 = −1.50853e−009
A8 = 6.91363e−013     A10 = −3.33549e−015

-continued

Numerical Embodiment 6
f = 4.92~126.95 Fno = 2.8~5.6 2ω = 75.8°~3.45°

SIXTH SURFACE

| K = 9.81564e+001 | A4 = −7.71852e−005 | A6 = 7.31146e−006 |
|---|---|---|
| A8 = −1.18980e−007 | A10 = 7.21908e−010 | |

SEVENTH SURFACE

| K = 7.48559e−001 | A4 = −3.19709e−004 | A6 = 3.32702e−006 |
|---|---|---|
| A8 = 1.95375e−007 | A10 = −6.86119e−009 | |

TWELFTH SURFACE

| K = −1.17003e+000 | A4 = 2.64991e−004 | A6 = 2.54344e−006 |
|---|---|---|
| A8 = −2.45797e−008 | A10 = −1.84054e−009 | |

FOURTEENTH SURFACE

| K = −1.92304e+002 | A4 = 2.46450e−004 | A6 = −1.44708e−005 |
|---|---|---|
| A8 = 5.51061e−007 | A10 = 1.28868e−009 | |

TWENTIETH SURFACE

| K = 3.56498e+000 | A4 = −9.16560e−005 | A6 = −1.44839e−006 |
|---|---|---|
| A8 = 4.03677e−008 | A10 = −9.21119e−010 | |

VARIOUS DATA

| ZOOMING RATIO | 25.81 | | |
|---|---|---|---|
| | WIDE ANGLE END | MIDDLE POSITION | TELEPHOTO END |
| FOCAL LENGTH | 4.92 | 11.85 | 126.95 |
| F NUMBER | 2.51 | 3.51 | 5.62 |
| ANGLE OF VIEW | 37.90 | 17.91 | 1.73 |
| IMAGE HEIGHT | 3.83 | 3.83 | 3.83 |
| TOTAL LENGTH OF LENS | 78.27 | 81.54 | 90.71 |
| BF | 9.07 | 11.16 | 3.69 in air |
| d5 | 0.94 | 10.98 | 29.22 |
| d10 | 21.49 | 15.34 | 0.68 |
| d11 | 9.83 | 2.69 | 1.07 |
| d16 | 2.59 | 7.43 | 4.86 |
| d19 | 1.58 | 1.18 | 18.44 |
| d22 | 5.76 | 7.85 | 0.38 |
| d24 | 2.82 | 2.82 | 2.82 |
| ENTRANCE PUPIL | 20.46 | 46.57 | 249.32 |
| EXIT PUPIL | 575.87 | −95.08 | 33.06 |
| FRONT PRINCIPAL-POINT POSITION | 25.42 | 56.99 | 909.19 |
| REAR PRINCIPAL-POINT POSITION | −2.10 | −9.02 | −124.13 |

ZOOM-LENS GROUP DATA

| GROUP | FIRST SURFACE | FOCAL LENGTH | LENS STRUCTURAL LENGTH | FRONT PRINCIPAL-POINT POSITION | REAR PRINCIPAL-POINT POSITION |
|---|---|---|---|---|---|
| 1 | 5 | 44.59 | 12.59 | 3.51 | −4.72 |
| 2 | 10 | −8.33 | 7.36 | 0.26 | −5.52 |
| 3 | 11 | ∞ | 0.00 | 0.00 | 0.00 |
| 4 | 16 | 18.40 | 7.49 | −4.70 | −7.88 |
| 5 | 19 | −55.00 | 1.50 | 0.70 | −0.15 |
| 6 | 22 | 15.60 | 3.55 | 0.57 | −1.41 |
| 7 | 24 | ∞ | 0.75 | 0.25 | −0.25 |

MOVING COEFFICIENT

| FIRST GROUP: | a1 = 55.89997 | a2 = −−281.27812 | a3 = 378.07634 | a4 = 85.37474 |
|---|---|---|---|---|
| | a5 = −807.17461 | a6 = 871.62446 | a7 = −314.96604 | |
| SECOND GROUP: | a1 = 46.88367 | a2 = −208.63785 | a3 = 429.64133 | a4 = −260.24021 |
| | a5 = −117.94269 | a6 = 155.83755 | a7 = −29.70786 | |
| APERTURE GROUP: | a1 = 11.29468 | a2 = −25.36121 | a3 = 9.08227 | |
| THIRD GROUP: | a1 = −13.74436 | a2 = 6.35404 | a3 = −14.53891 | |

TABLE 1

| CONDITION EXPRESSION | FIRST EMBODIMENT | SECOND EMBODIMENT | THIRD EMBODIMENT | FOURTH EMBODIMENT | FIFTH EMBODIMENT | SIXTH EMBODIMENT |
|---|---|---|---|---|---|---|
| (1) | 1.740 | 2.077 | 1.899 | 1.770 | 1.770 | 1.784 |
| (2) | 0.321 | 0.334 | 0.352 | 0.325 | 0.333 | 0.333 |
| (3) | 0.383 | 0.698 | 0.604 | 0.443 | 0.420 | 0.447 |
| (4) | 0.132 | 0.142 | 0.117 | 0.135 | 0.129 | 0.132 |
| (5) | 2.926 | 2.585 | 2.872 | 2.846 | 2.879 | 2.847 |
| (6) | 0.113 | 0.090 | 0.097 | 0.112 | 0.111 | 0.110 |
| (7) | 0.215 | 0.255 | 0.224 | 0.222 | 0.219 | 0.223 |
| (8) | −5.420 | −6.225 | −5.398 | −5.439 | −5.324 | −5.355 |

Next, a digital still camera according to an embodiment of the present invention will be described with reference to FIG. 13, where the zoom lens according to any of the above-described embodiments is provided in the digital still camera, as an imaging optical system.

In FIG. 13, a camera main body 20 and an imaging optical system 21 including a zoom lens according to any of the first to sixth embodiments are provided. A solid-state image pickup element (photoelectric conversion element) 22, which is provided in the camera main body 20, includes a CCD sensor, a CMOS sensor, and so forth which receives the light of a subject image formed by the imaging optical system 21. A memory 23 stores the information corresponding to a subject image subjected to photoelectric conversion through the solid-state image pickup element 22. A finder 24 includes a liquid-crystal display panel or the like and is provided to observe a subject image formed on the solid-state image pickup element 22.

Thus, a downsized imaging device having high optical capabilities can be achieved by using a zoom lens according to an embodiment of the present invention for an imaging device including a digital still camera or the like.

The above-described embodiment allows for obtaining a downsized zoom lens having a high zooming ratio, a small front lens diameter, and high optical capabilities throughout the entire zooming range.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-149226 filed on Jun. 6, 2008, which is hereby incorporated by reference herein in its entirety.

What is claimed is:

1. A zoom lens comprising:
a first lens group having a positive refractive power;
a second lens group having a negative refractive power;
a third lens group having a positive refractive power; and
a fourth lens group having either the positive refractive power or the negative refractive power, the first through the fourth lens group being arranged in that order from an object side toward an image side,
wherein, in the zoom lens, intervals between the lens groups are changed upon zooming, and
wherein, when a focal length of an entire system at a wide angle end is fW, a focal length of the entire system at a telephoto end is fT, a focal length of the first lens group is f1, a focal length of the second lens group is f2, a distance between a position to which the first lens group moves upon zooming, the position being closest to the object side, and a position of the first lens group at the wide angle end is m1, and a difference between a largest distance between the first lens group and the second lens group upon zooming and a distance between the first and second lens groups at the wide angle end is X1, a condition represented by:

$1.3 < f1/\sqrt{(fW \times fT)} < 2.0$, $0.2 < |f2|/\sqrt{(fW \times fT)} < 0.4$, and $0.3 < m1/X1 < 0.75$ is satisfied.

2. The zoom lens according to claim 1,
wherein, when a zooming ratio Z is represented by $Z = fT/fW$, a condition represented by $0.1 < X1/(|f2| \times Z) < 0.2$ is satisfied.

3. The zoom lens according to claim 1,
wherein, the first lens group satisfies a condition represented by $2.0 < fT/f1 < 5.0$.

4. The zoom lens according to claim 1,
wherein, the first lens group satisfies a condition represented by $0.07 < fW/f1 < 0.13$.

5. The zoom lens according to claim 1,
wherein, the difference X1 satisfies a condition represented by $0.2 < X1/fT < 0.35$.

6. The zoom lens according to claim 1,
wherein, the first and second lens groups satisfy a condition represented by $-7.0 < f1/f2 < -5.0$.

7. The zoom lens according to claim 1, wherein the second lens group includes a negative lens, a second negative lens, and a positive lens that are arranged in that order from the object side toward the image side, and at least one of surfaces of the negative lenses and the positive lens has an aspheric shape.

8. The zoom lens according to claim 1, wherein the first lens group includes a negative lens, a positive lens, and a second positive lens that are arranged in that order from the object side toward the image side, and at least one of surfaces of the negative lens and the positive lenses has an aspheric shape.

9. The zoom lens according to claim 1,
wherein, upon zooming from the wide angle end to the telephoto end, the first lens group moves toward the image side, and subsequently moves toward the object side, to be closer to the object side at the telephoto end than the first lens group is at the wide angle end, the second lens group moves toward the image side, the third lens group moves toward the object side, and the fourth lens group moves along a path forming a locus convex toward the object side.

10. An imaging device comprising:
a zoom lens; and
a solid-state image pickup element configured to receive light of an image formed by the zoom lens,
wherein the zoom lens includes:
a first lens group having a positive refractive power;
a second lens group having a negative refractive power;
a third lens group having the positive refractive power; and
a fourth lens group having either the positive refractive power or the negative refractive power, the first through the fourth lens group being arranged in that order from an object side toward an image side,
wherein, in the zoom lens, intervals between the lens groups are changed upon zooming, and
wherein, when a focal length of an entire system at a wide angle end is fW, a focal length of the entire system at a telephoto end is fT, a focal length of the first lens group is f1, a focal length of the second lens group is f2, a distance between a position to which the first lens group moves upon zooming, the position being closest to the object side, and a position of the first lens group at the wide angle end is m1, and a difference between a largest distance between the first lens group and the second lens group upon zooming and a distance between the first and second lens groups at the wide angle end is X1, a condition represented by:

$$1.3 < f1/\sqrt{(fW \times fT)} < 2.0,$$

$$0.2 < |f2|/\sqrt{(fW \times fT)} < 0.4, \text{ and}$$

$$0.30 < m1/X1 < 0.75$$

is satisfied.

* * * * *